US011966388B1

(12) United States Patent
Esman

(10) Patent No.: US 11,966,388 B1
(45) Date of Patent: Apr. 23, 2024

(54) UPDATING AND EXECUTING SEARCH QUERIES OF MULTIPLE INDEPENDENT PANELS OF A DASHBOARD

(71) Applicant: Splunk Inc., San Francisco, CA (US)

(72) Inventor: Gleb Esman, Henderson, NV (US)

(73) Assignee: SPLUNK INC., San Francisco, CA (US)

( * ) Notice: Subject to any disclaimer, the term of this patent is extended or adjusted under 35 U.S.C. 154(b) by 0 days.

(21) Appl. No.: 17/877,002

(22) Filed: Jul. 29, 2022

(51) Int. Cl.
*G06F 16/242* (2019.01)
*G06F 16/2455* (2019.01)
*G06F 16/248* (2019.01)

(52) U.S. Cl.
CPC ...... *G06F 16/2428* (2019.01); *G06F 16/2455* (2019.01); *G06F 16/248* (2019.01)

(58) Field of Classification Search
CPC . G06F 16/2428; G06F 16/2455; G06F 16/248
See application file for complete search history.

(56) References Cited

U.S. PATENT DOCUMENTS

| | | | |
|---|---|---|---|
| 7,873,622 B1* | 1/2011 | Karls | H10B 61/00 707/707 |
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 10,565,220 B2* | 2/2020 | Porath | G06F 16/2477 707/707 |
| 2009/0119280 A1* | 5/2009 | Waters | G06F 16/951 707/999.005 |
| 2015/0212663 A1* | 7/2015 | Papale | G06Q 10/063 715/762 |
| 2017/0052984 A1* | 2/2017 | Treiser | G06F 16/254 707/707 |
| 2018/0024731 A1* | 1/2018 | Sanches | G06F 3/04817 715/763 |
| 2019/0098106 A1 | 3/2019 | Mungel et al. | |

(Continued)

OTHER PUBLICATIONS

Splunk Enterprise 8.0.0 Overview, available online, retrieved May 20, 2020 from docs.splunk.com.

(Continued)

*Primary Examiner* — Yuk Ting Choi
(74) *Attorney, Agent, or Firm* — AEON Law, PLLC; Adam L. K. Philipp; James Namiki

(57) ABSTRACT

The disclosed embodiments relate to systems and methods that provides a dashboard that includes multiple independent panels where each independent panel functions independently and is associated with a respective search query that when executed generates data that may populate and/or configure the associated panel. The systems and methods further permits generation of a filter condition based on user input provided through a single panel and automatically apply the filter condition to the queries of some or all of the queries of the independent panels of the dashboard and execute the updated queries to update some or all of the independent panels.

19 Claims, 16 Drawing Sheets

(56) References Cited

U.S. PATENT DOCUMENTS

| | | | |
|---|---|---|---|
| 2020/0012656 A1* | 1/2020 | Pugh | G06F 16/248 707/707 |
| 2021/0173713 A1* | 6/2021 | Lei | G06F 9/5027 707/707 |
| 2023/0051662 A1* | 2/2023 | Sauls | G06F 8/34 707/707 |

OTHER PUBLICATIONS

Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Carraso, David, "Exploring Splunk," published by CITO Research, New York, NY, Apr. 2012.
Bitincka, et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

Multi-Field Interactive Investigation Panel

Total Selected Events: 580,479/34,741 | Selected timeframe: 2021-02-05 08:00:00 2021-03-12 08:00:00

Field list: Compact | Detailed

Countries (1)

| Country | Events # User |
|---|---|
| 1 China | 34741 |

Regions (27)

| # | Region | Events # |
|---|---|---|
| 1 | Qinghai | 1 |
| 2 | Guizhou | 3 |
| 3 | --- | 9 |
| 4 | Chongqing | 12 |
| 5 | Shanxi | 12 |
| 6 | Yunnan | 14 |
| 7 | Tianjin | 15 |
| 8 | Heilongjiang | 16 |
| 9 | Hebei | 19 |
| 10 | Liaoning | 30 |

« Prev [1] 2 Next »

IP Addresses (670)

| # | Src_IP | Country |
|---|---|---|
| 1 | 220.181.125.146 | China |
| 2 | 125.64.94.206 | China |
| 3 | 106.38.241.101 | China |
| 4 | 183.19.23.224 | China |
| 5 | 180.76.15.144 | China |
| 6 | 180.76.15.150 | China |
| 7 | 180.76.15.162 | China |
| 8 | 180.76.15.136 | China |
| 9 | 180.76.15.145 | China |
| 10 | 180.76.15.32 | China |

« Prev [1] 2 3 4 5

Usernames (7)

| # | Username | Events # | Co |
|---|---|---|---|
| 1 | --- | 34713 | |
| 2 | jhess94054 | 10 | |
| 3 | gregory | 8 | |
| 4 | greg | 4 | |
| 5 | proof19622 | 3 | |
| 6 | andrei | 2 | |
| 7 | Test | 1 | |

Http Status (7)

| # | status | Events # |
|---|---|---|
| 1 | 404 | 24951 |
| 2 | 500 | 4851 |
| 3 | 403 | 2708 |
| 4 | 404 | 1951 |
| 5 | 500 | 436 |
| 6 | 403 | 228 |
| 7 | 480 | 16 |

FIG. 2D

UPDATING AND EXECUTING SEARCH QUERIES OF MULTIPLE INDEPENDENT PANELS OF A DASHBOARD

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Dashboards, which are commonly presented in the form of graphical user interfaces (GUIs), have been found to be useful in viewing, for example, high-level performance data of large enterprise computer network systems. For instance, dashboards for monitoring the performance of a modern computer/server network system (e.g., cloud system) may retrieve and display specific data of interest that may assist a user to assess various aspects and performances of the system. Such dashboards may be specially designed to pull and display data related to, among other things, performance data of various software and hardware components of large distributed enterprise systems, particularly at a high-level.

BRIEF DESCRIPTION OF THE DRAWINGS

Illustrative examples are described in detail below with reference to the following figures:

FIG. 2D illustrates a fourth instance of the second example dashboard that displays, at least partially, multiple independent panels, in accordance with some example implementations.

DETAILED DESCRIPTION

Figure 1A:
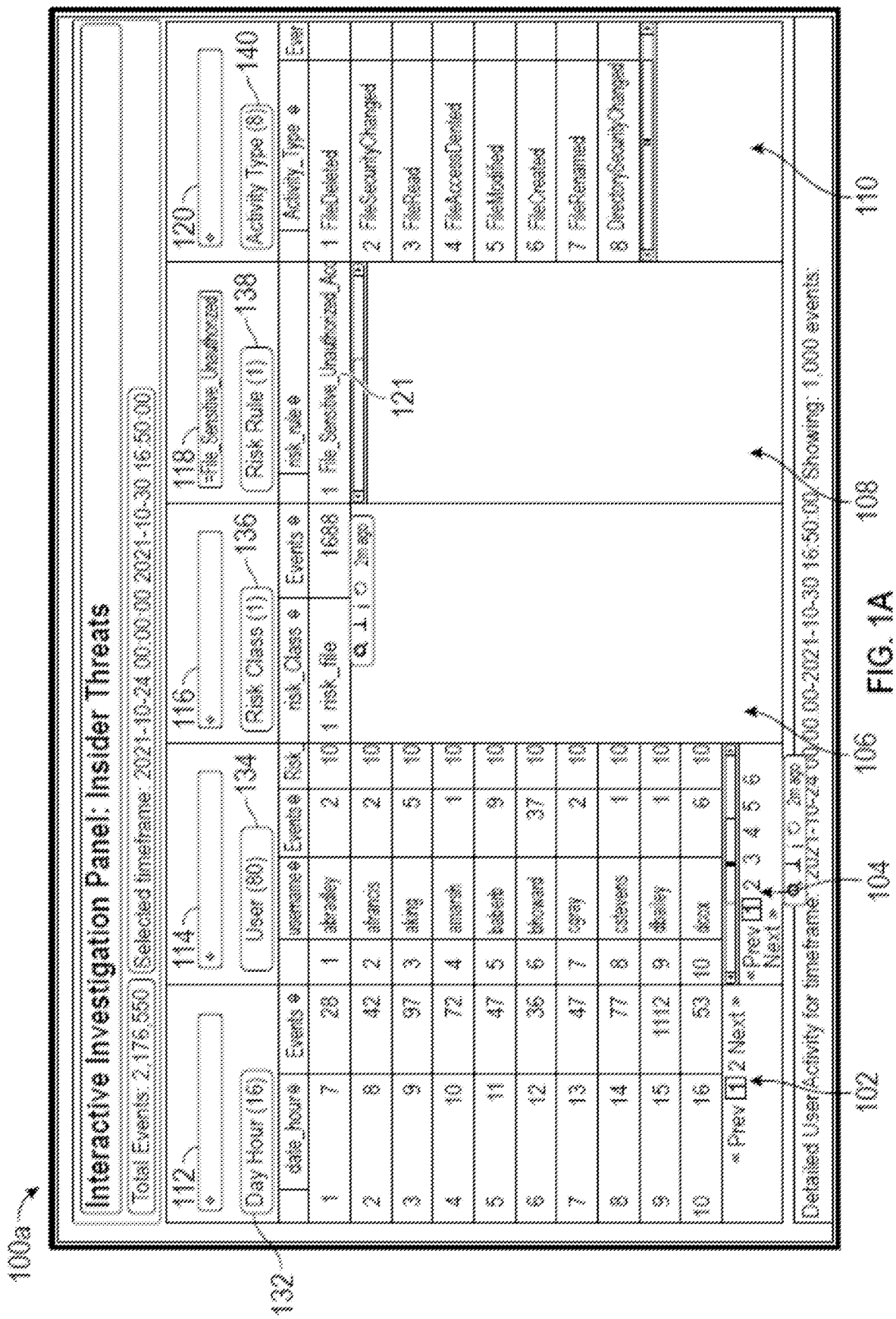
FIG. 1A illustrates a first instance of an example dashboard that displays, at least partially, multiple independent panels, in accordance with some example implementations.

One problem faced by dashboard developers is that the amount and variety of data generated by, for example, large cloud systems can be enormous, and therefore, designing a dashboard for monitoring various aspects and performance of such systems may be challenging, particularly when the visual display through which the dashboards are presented have limited "real estate" to display the data presented through the dashboards.

The present disclosure relates to systems and methods for providing dashboards that allow users to view, from different perspectives, a wide range of data generated by, for example, distributed enterprise systems. More particularly, the systems and methods may provide a dashboard that includes multiple independent panels that function independently and that present different perspectives of the data of interest, where each independent panel is associated with a respective search query that when executed generates the data that may populate and/or configure the associated panel. Although the generated dashboard includes multiple panels that function independently, the systems and methods permit the automatic application of a filter condition (e.g., a search string), which was generated through one of the independent panels, to the respective search queries of multiple independent panels of the dashboard. In some cases, a filter condition generated through one of the independent panels may be applied to the respective search queries of all the independent panels of the dashboard. These features may allow a user to, among other things, quickly pinpoint and identify existing issues/anomalies that may be present in, for example, the large volume of data generated by a large cloud computing/server enterprise system.

In various implementations, an independent panel may be presented in the form of a table, a grid, a graph, or some other form that is populated by and/or configured by data generated by executing the respective query associated with the panel. Since an independent panel may be embodied in the form of a table or grid that may be relatively large, in various implementations, only a portion of the panel that is scrollable may be displayed through the dashboard at any given moment in time. In various implementations, the dashboard that may be provided may be implemented via a graphical user interface (GUI).

When a user initiates a user dashboard session, the associated search queries (or simply "queries") of the panels of the dashboard that may be initially executed may be preset or preprogrammed search queries that are designed to search for a specific set of data to initially populate and/or configure the panels. That is, in various implementations, a dashboard may be provided with multiple independent panels that are each associated with a respective "default" query that can be subsequently updated during a user dashboard session with the application of one or more filter conditions as will be further described herein. For example, once a user dashboard session has been initiated and all the panels of the dashboard have been initially populated and/or configured with the initial set of data generated by the default queries of the panels, the default queries may subsequently be updated with one or more filter conditions that are generated through one or more of the panels. For example, in various implementations, a filter condition (e.g., search string) may be generated in response to user input provided through one of the independent panels of the dashboard and then automatically applied to the default query associated with the independent panel through which the user input was entered as well as to the respective default queries of one or more of the other independent panels of the same dashboard. In some cases, the filter condition may be applied to the default queries of all the other independent panels of the dashboard. During the course of a dashboard user session, the associated search queries of the panels of the dashboard may evolve as successive filter conditions are applied to the independent panels.

Figure 1B:
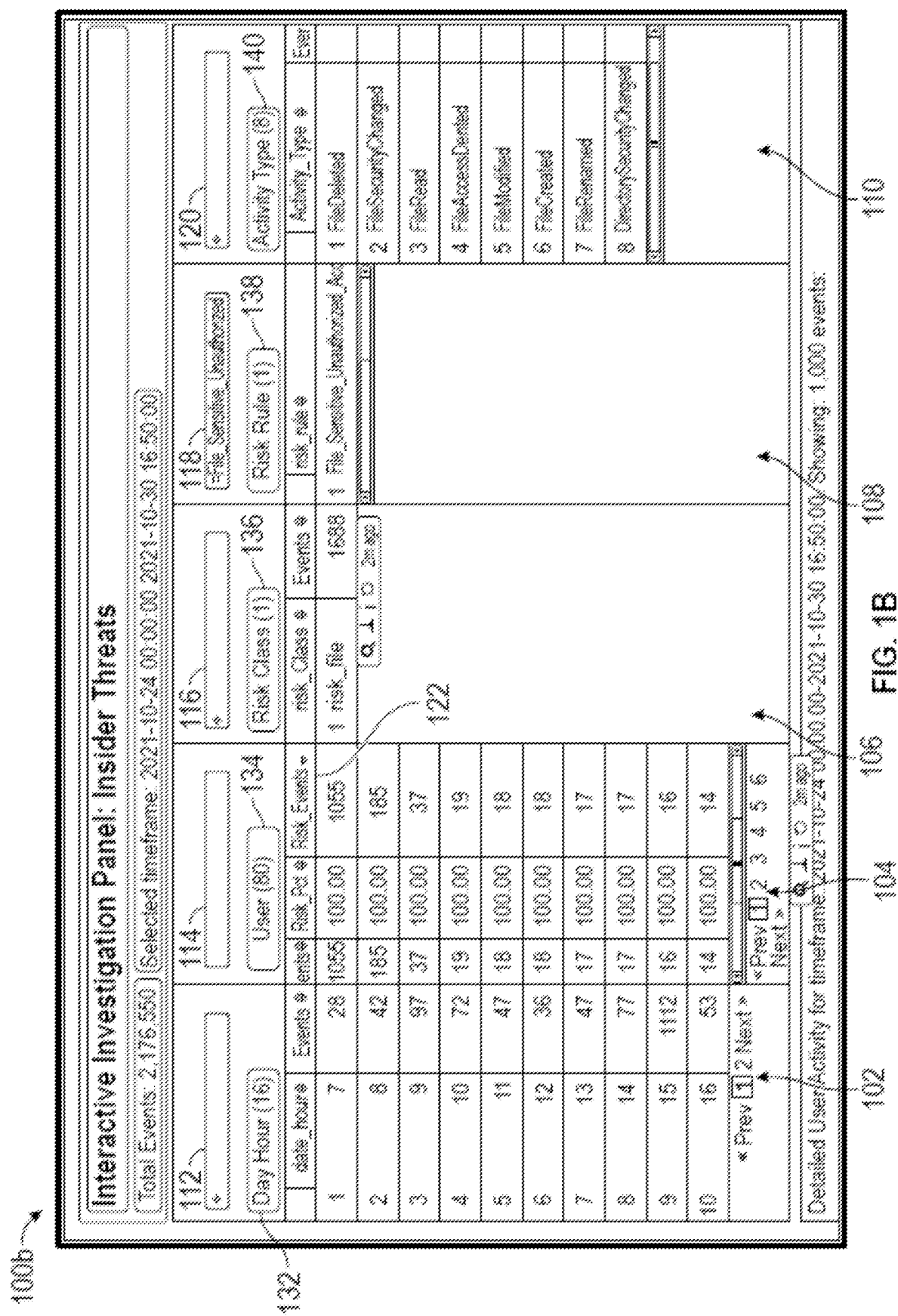
FIG. 1B illustrates a second instance of the example dashboard that displays, at least partially, multiple independent panels, in accordance with some example implementations.
Figure 1C:
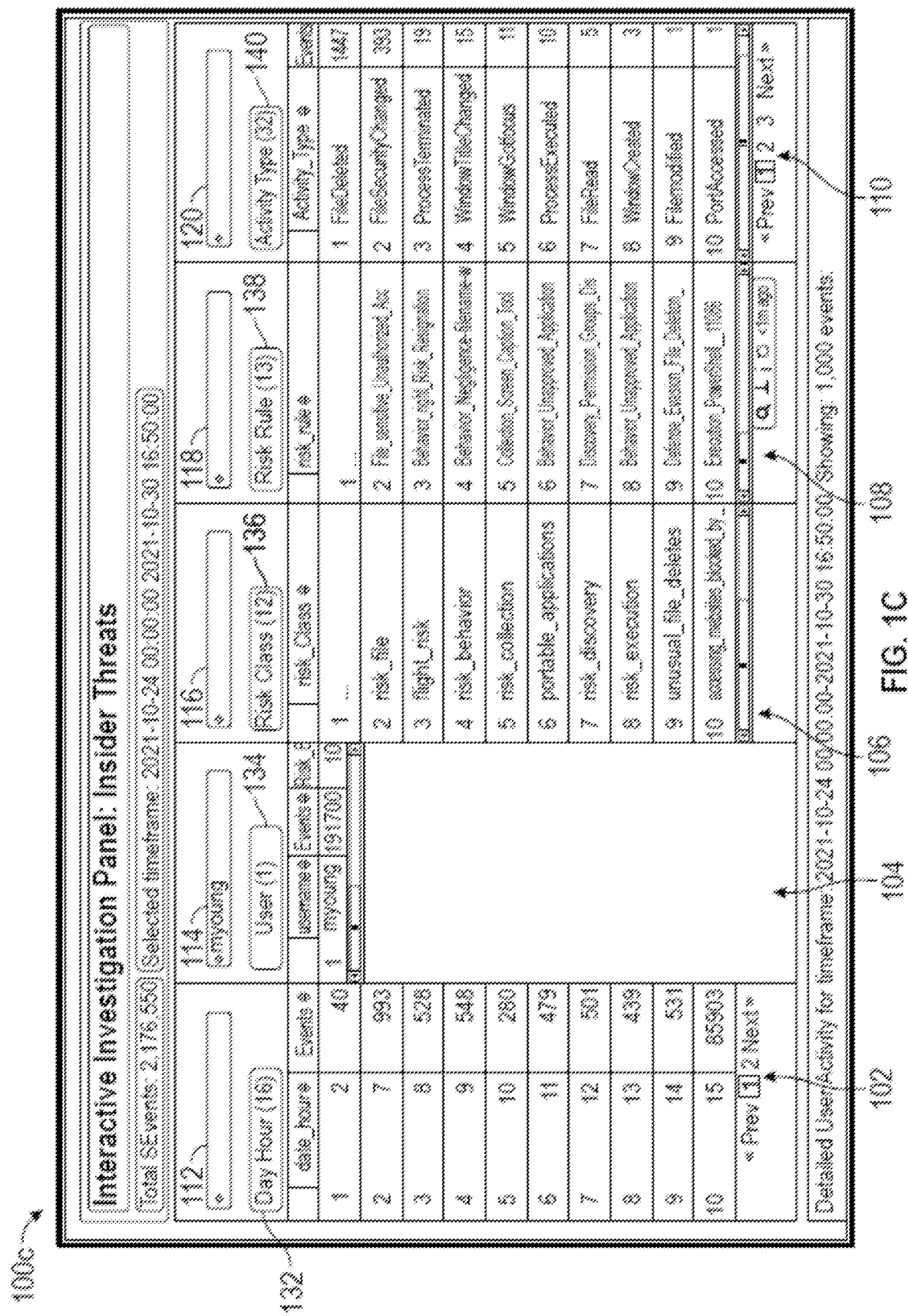
FIG. 1C illustrates a third instance of the example dashboard that displays, at least partially, multiple independent panels, in accordance with some example implementations.

FIGS. 1A, 1B, and 1C illustrate different instances of an example dashboard that displays, at least partially, multiple independent panels where each independent panel is associated with a respective query that when executed generates data that may be used to populate and/or configure the associated panel. As a result, a panel of the example dashboard may function independently from the other panels of the dashboard. The example dashboard may permit a filter condition (e.g., a search string) to be generated based on user input provided through one of the independent panels and automatically apply the filter condition to the query associated with the independent panel through which the user input was entered, as well as to the queries of one or more of the other independent panels according to various implementations.

In particular, each panel may be associated with a respective search query (hereinafter simply "query") and the data generated by the execution of the queries of the panels may be displayed in the form of a table or grid, or in some other format that is populated and/or configured by the generated data. Because each panel operates independently from the other panels, data included in each panel may be re-sorted independently without impacting the other panels. And although each panel functions independently from the other panels of the dashboard, whenever a new filter condition is generated as a result of user input provided through one of the panels, that filter condition may be automatically applied to the query associated with the panel through which the user input was inputted as well as to the queries of one or more of the other panels of the dashboard as will be further described herein. In some cases, the filter condition that is generated in response to user input provided through one of the panels may be applied to the associated queries of all of the panels of the dashboard.

Referring particularly to FIG. 1A, which illustrates an instance 100a of a dashboard (hereinafter "dashboard instance 100a") that includes a plurality of independent panels 102, 104, 106, 108, and 110 (hereinafter "panels 102, 104, 106, 108, and 110"). In the implementation illustrated in FIGS. 1A, 1B, and 1C, each panel 102, 104, 106, 108, and 110 includes a table that is populated by data generated from each panel's associated query, but only a portion of the tables of each panel 102, 104, 106, 108, and 110 are displayed through the dashboard instance 100a due to the limited "real estate" available on the screen of a typical client computing device to display such tables. For example, although FIG. 1A appears to show the table of panel 104 as having only three columns and 10 rows of data, the table of panel 104 actually includes data in many other rows and columns not shown in FIG. 1A. Note that for purposes of the following, "*" represents a wildcard. Thus, references to dashboard instance 500* may be in reference to dashboard instance 100a, dashboard instance 100b, or dashboard instance 100c of FIG. 1A, 1B, or 1C.

The dashboard instance 100a further includes text fields 112, 114, 116, 118, and 120 that may be used to enter user inputs through the different panels 102, 104, 106, 108, and 110, where a user input may form the basis for generating a filter condition (e.g., a search string) that may be applied to and supplement the search queries of at least some of the panels 102, 104, 106, 108, and 110. The text fields 112, 114, 116, 118, and 120 of panels 102, 104, 106, 108, and 110 may also be able to display a textual representation of a filter condition that was selected through the respective panel as will be further described herein.

Dashboard instance 100a represents an example dashboard (hereinafter "threats dashboard") for identifying internal threats of, for example, a computer/server network system. In particular, the dashboard instance 100a through panels 102, 104, 106, 108, and 110 displays various data that may facilitate a user to assess and identify internal security threats.

Because each panel 102, 104, 106, 108, and 110 functions independently, stack sorting of a table of an individual panel 102, 104, 106, 108, or 110 may be independently performed without impacting the other panels. For example, and as noted above, each panel 102, 104, 106, 108, and 110 may comprise a table that includes multiple rows and multiple columns. Each column represents a "field." At the top of each field is the name or heading for the field (column), for example, the name of the far-left field for panel 102 is date_hour. The values under each field name will be referred to herein as "field values." For example, under the date_hour heading in panel 102 are the field values of 7, 8, 9, and so forth.

In various implementations, each panel 102, 104, 106, 108, and 110 may include a "primary field" (e.g., primary column) that may be located at the far-left side of each panel 102, 104, 106, 108, and 110. The relevancy of a "primary field" will become more apparent below. But in brief, and among other things, the "primary field values" under the primary field may be selected to automatically generate a filter condition.

In some cases, particularly at the start of a user dashboard session, the primary field for a panel 102, 104, 106, 108, or 110 may be the default primary field for the panel 102, 104, 106, 108, or 110. During a user dashboard session, however, a user may select/designate one of the other fields (e.g., columns) of a panel 102, 104, 106, 108, or 110 to be the primary field for the panel 102, 104, 106, 108, or 110. For example, towards the top of each panel 102, 104, 106, 108, and 110 is a selection window 132, 134, 136, 138, and 140 through which a user can select/designate one of the fields (e.g., columns) of the respective panel 102, 104, 106, 108, or 110 as the primary field for the panel 102, 104, 106, 108, or 110. Through a selection window 132, 134, 136, 138, or 140 a field name list may be displayed that lists the names of the fields (e.g., columns) that are included in the respective panel. In various implementations, a user may designate through the selection window 132, 134, 136, 138, or 140 one of the fields of the associated panel 102, 104, 106, 108, or 110 as the primary field for the associated panel 102, 104, 106, 108, or 110.

Of course, and as noted above, at the start of a user dashboard session, one of the fields of each panel may be preset as the designated primary field for that panel. For example, in FIG. 1A, the selection window 132 indicates the primary field for panel 102 as "Day Hour," the selection window 134 indicates the primary field for panel 104 as "User," the selection window 136 indicates the primary field for panel 106 as "Risk Class," the selection window 138 indicates the primary field for panel 108 as "Risk Rule (1), and the selection window 140 indicates the primary field for panel 110 as "Activity Type". The number in brackets in each selection window 132, 134, 136, 138, or 140 indicates the number of "hits" (e.g., field values) found under each field (e.g., column).

The primary field values under the primary field of each panel 102, 104, 106, 108, and 110 when selected or "clicked," may cause a filter condition to be selected for application to the queries of some or all of the panels 102, 104, 106, 108, and 110. For example, by clicking or selecting the primary field value of "abradley" under the primary field of "username" in panel 104, a filter condition may be selected for application to at least some of the panels 102, 104, 106, 108, and 110 that seeks out data (e.g., field values) associated with the username "abradley."

Each row of each panel 102, 104, 106, 108, and 110, which will be referred to herein as a "result row," comprises data (e.g., field values) that are linked to a "primary field value" (e.g., the field value in the far-left column, which is the primary field value for the row). As will be further described herein, the result rows of a panel, such as panel 104, may be re-sorted by simply clicking or selecting one of the field headings (e.g., field headings) and based on field values of the selected field as will be described below.

The dashboard instance 100a in FIG. 1A is the instance of the threats dashboard after a filter condition was applied to all the associated default queries of all the panels 102, 104, 106, 108, and 110 and the updated queries were executed to generate data used to populate all the tables of panels 102, 104, 106, 108, and 110. In various implementations, the filter condition may have been generated in response to user input provided through panel 108. For example, note that in FIG. 1A panel 108 includes only a single result row with a primary field value 121 for "File_Sensitive_Unauthorized . . . " This is because the displayed primary field value 121 for "File_Sensitive_Unauthorized . . . " was previously selected or "clicked" through panel 108, which resulted in the generation of a filter condition that seeks data (e.g., field values) associated with primary field for risk_Class="File_Sensitive_Unauthorized . . . " A representation of this filter condition is shown in text field 118. Upon the filter condition being generated, it was applied to the default query for panel 108. As a result, all the other result rows for panel 108 were filtered out resulting only in one result row with a primary field value of "File_Sensitive_Unauthorized . . . " remaining in the table of panel 108. In various implementations, the generated filter condition (e.g., seeking data associated with risk_Class "File_Sensitive_Unauthorized . . . ") was further applied to the existing queries of all the other panels 102, 104, 106, and 110, and the updated queries were executed to update the other panels 102, 104, 106, and 110.

As noted above, each panel 102, 104, 106, 108, and 110 of FIG. 1A may include additional fields (e.g., columns) other than those illustrated in FIG. 1A. For example, in addition to the username, Events, and Risk_Percents fields (columns) included in panel 104, panel 104 may comprise many other fields (e.g., columns) including, for example, Risk_Pct, Risk_Events, and so forth as shown in FIG. 1B. Note that FIG. 1B shows another dashboard instance 100b of the threats dashboard after the table portion of panel 104 was scrolled to the right and the Risk_Events field heading 122 at the right-most column in panel 104 was selected (e.g., "clicked") to cause the table in panel 104 to be independently re-sorted as will be further described below. As shown, dashboard instance 100b substantially mirrors dashboard instance 100a. That is, all the panels with the exception of panel 104 remain unchanged. As briefly described above, once the Risk_Events heading 122 was selected or clicked, all the result rows in panel 104 were rearranged in descending order from the result row with the highest field value for the Risk_Events at the top to the result row with the lowest Risk_Events field value at the bottom. This sorting process will be referred to herein as independent "stack sorting" since only the table in panel 104 was re-sorted without the other tables in the other panels 102, 106, 108, and 110 likewise being re-sorted. As one of ordinary skill in the art will recognize, although the example stack sorting illustrated here sorted the result rows in descending order from the result row with the highest field value at the top to the result row with lowest field value at the bottom, in alternative implementations, the stack sorting may be performed that will list the result rows in ascending order or according to some other basis.

In FIG. 1B, the result row with the highest Risk_Events field value is at the top of the table of panel 104 with a field value of 1055. Note that, although not shown in FIG. 1B, the username that is associated with the row with the highest Risk_Events field value is "myoung," which is shown in FIG. 1C. Turning to FIG. 1C, which illustrates a third dashboard instance 100c for the same threats dashboard after the primary field value "myoung" under the username (column) was selected (note that text field 114 in FIG. 1C shows the text "myoung" that represents the filter condition that was generated). Because the primary field value "myoung" was selected, a filter condition was generated for application that looks for data (e.g., field values) associated with the username "myoung," which is reflected in text field 114 that now shows the textual representation ("myoung") of the generated filer condition. Because the "myoung" filter condition was generated based on user input provided through panel 104 and applied to panel 104, the same filter condition was automatically applied to the queries of the other panels 102, 106, 108, and 110, and the updated queries for each of the other panels 102, 106, 108, and 110 were rerun to generate new data for populating and/or configuring the other panels 102, 106, 108, and 110. Note that in alternative implementations, only the queries of a subset of the other panels 102, 106, 108, and 110 may be updated with the new filter condition and rerun.

FIGS. 2A, 2B, 2C, 2D, 2E, and 2F illustrate different instances of a second example dashboard according to various implementations of the present disclosure. The dashboard, in this case, may be used to seek out, analyze, and display data for general investigative purposes such as, for example, looking for anomalous events associated with the data of interest, such as data generated by a large and distributed enterprise system.

Similar to the example threats dashboard represented by the dashboard instances 100a, 100b, and 100c of FIGS. 1A, 1B, and 1C, the example dashboard (hereinafter "investigative dashboard"), represented by the dashboard instances 100a, 100b, 100c, 100d, 100e, and 100f of FIGS. 2A, 2B, 2C, 2D, 2E, and 2F, includes a plurality of independent panels 202, 204, 206, 208, and 210 that are each associated with their own respective query. As with the panels 102, 104, 106, 108, and 110 of the dashboard instances 100a, 100b, and 100c of FIGS. 1A, 1B, and 1C, the panels 202, 204, 206, 208, and 210 functions independently from each other. However, although panels 202, 204, 206, 208, and 210 function independently, similar to panels 102, 104, 2106, 108, and 110 of FIGS. 1A, 1B, and 1C, a filter condition that is generated based on user input entered through one of the panels 202, 204, 206, 208, or 210 may be automatically applied to, in addition to the search query associated with the panel that the user input was entered through, the respective queries of one or more of the other panels. Note that in some implementations, a filter condition (e.g., search string) that is generated as a result of user input provided through a single panel 202, 204, 206, 208, or 210 may be applied to the search queries of all of the panels 202, 204, 206, 208, and 210 of the dashboard.

In various implementations, the example investigative dashboard represented by the dashboard instances 200a, 200b, 200c, 200d, 200e, and 200f of FIGS. 2A, 2B, 2C, 2D, 2E, and 2F, as well as the threats dashboard represented by the dashboard instances 100a, 100b, and 100c of FIGS. 1A, 1B, and 1B may be built with simple Extensible Markup Language (XML) or via, for example, JavaScript based Unified Dashboard Framework (UDF) developed by Splunk Inc. of San Francisco, California.

Figure 2A:
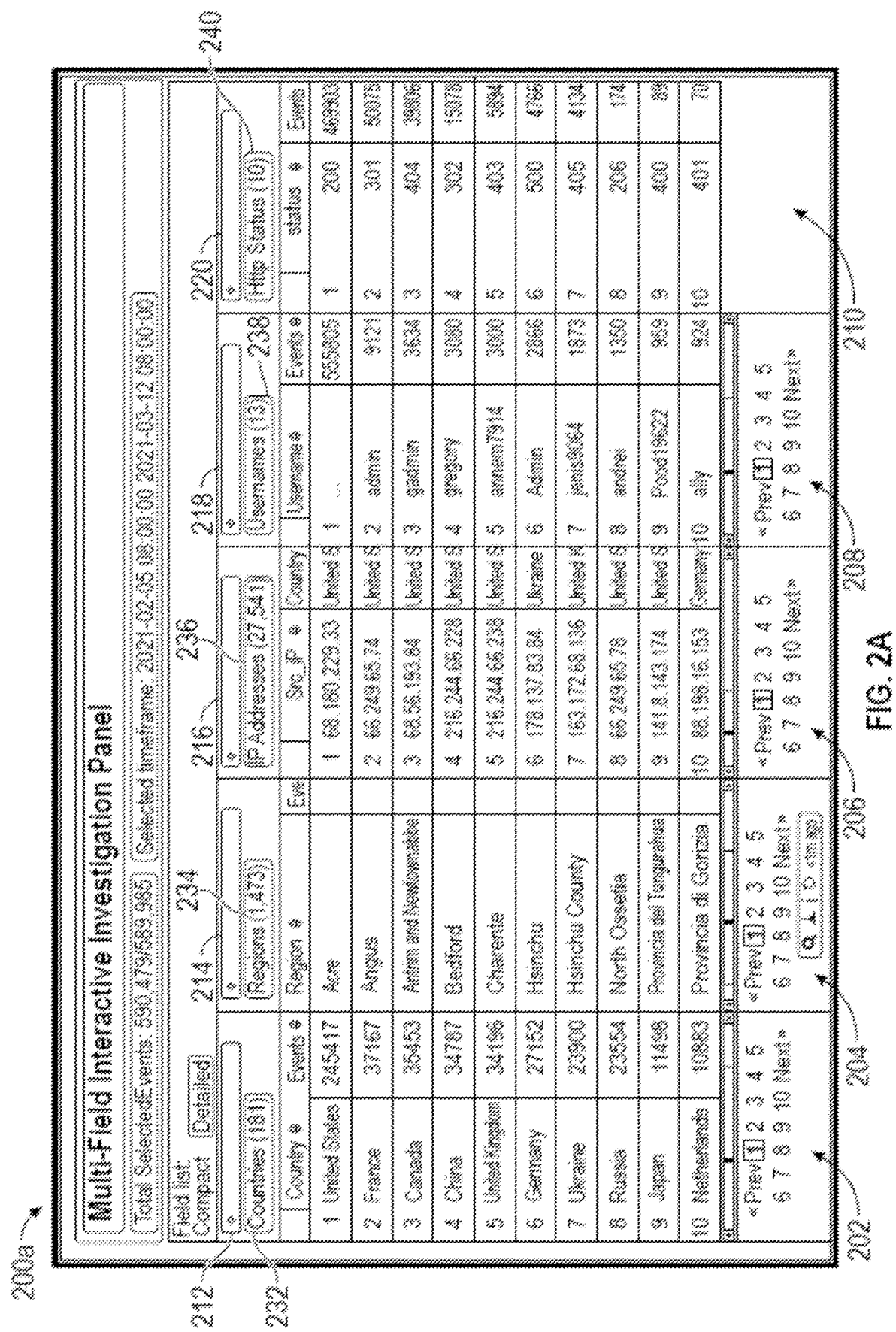
FIG. 2A illustrates a first instance of a second example dashboard that displays, at least partially, multiple independent panels, in accordance with some example implementations.

Referring particularly now to FIG. 2A, which illustrates a dashboard instance 100a of the investigative dashboard after a user dashboard session has been initiated/activated according to some implementations of the present disclosure. The dashboard instance 100a includes a plurality of independent panels 202, 204, 206, 208, and 210. Each panel 202, 204, 206, 208, and 210 may be associated with a respective search query that when executed, outputs data that may be used to populate (or configure if the results are presented, for example, in graphical form) their associated panel 202, 204, 206, 208, or 210. Dashboard instance 100a in FIG. 2A represents the instance when a user dashboard session was initiated, and the respective default queries of panels 202, 204, 206, 208, and 210 were executed to generate the initial set of data used to populate the tables of panels 202, 204, 206, 208, and 210. That is, whenever a new user dashboard session is initiated, the respective default search queries for each panel 202, 204, 206, 208, and 210 may be executed to generate data used to initially populate and/or configure each panel 202, 204, 206, 208, and 210. As will be further described herein, during a dashboard user session, these preset or default search queries of panels 202, 204, 206, 208, and 210 may be updated with additional filter conditions. As a result, the search queries of panels 202, 204, 206, 208, and 210 will evolve during the course of the user dashboard session and may be reset upon, for example, initiation of a new user dashboard session.

In various implementations, a filter condition that is generated may be in the form of a search string that when executed may seek (e.g., look for, parse, analyze) and output a specific set of data. As briefly described above a filter condition can be generated based on 1) user input; and 2) which panel the user input was entered through. That is, the user input that may be entered through a specific panel 202, 204, 206, 208, or 210 may be in the form of a selection of one of the primary field values of the panel or may be in the form of a simple text string that a user enters through a text field 232, 234, 236, 238, or 240 that may be converted to an executable search string based on the user input as well as the identity of the specific panel 202, 204, 206, 208, or 210 through which the user input was entered.

In some cases, in which the investigative dashboard is implemented via XML, a filter condition may be embodied in an XML token that may be passed along and applied to some or all of the respective queries of the panels 202, 204, 206, 208, and 210 of the investigative dashboard.

Referring back to FIG. 2A, located near the top of each panel 202, 204, 206, 208, and 210 is a selection window 232, 234, 236, 238, and 240 for selecting and showing a primary field (e.g., primary column) for each panel 202, 204, 206, 208, and 210, as well as for showing the number of "hits" (shown in brackets) found as a result of executing the associated queries of each panel 202, 204, 206, 208, and 210. Note that when a dashboard user session is initiated, the selection windows 232, 234, 236, 238, and 240, as depicted in FIG. 2A, will indicate the default primary fields of each panel 202, 204, 206, 208, and 210. For example, the selection window 232 of panel 202 indicates that the primary field for panel 202 is "Countries" and the number of hits "(181)" found for panel 202, the selection window 234 of panel 204 indicates that the primary field for panel 204 is "Regions" and the number of hits "(1,473)" found for panel 204, the selection window 236 of panel 206 indicates that the primary field for panel 206 is "IP Addresses" and the number of hits "(27,541)" found for panel 206, the selection window 238 of panel 208 indicates that the primary field for panel 208 is "Usernames" and the number of hits "(175)" found for panel 208, and the selection window 240 of panel 210 indicates that the primary field for panel 210 is "Http Status" and the number of hits "(10)" found for panel 210.

Similar to panels 102, 104, 2106, 108, and 110 of FIGS. 1A, 1B, and 1C, the panels 202, 204, 206, 208, and 210 in FIG. 2A each includes a table (herein "panel table") that comprises columns and rows, only portions of which are shown in FIG. 2A. The data populating these tables in panels 202, 204, 206, 208, and 210, as briefly described above, may be generated as a result of executing the existing search queries associated with these panels 202, 204, 206, 208, and 210, which in the instance 200a of FIG. 2A, are the default queries of the panels 202, 204, 206, 208, and 210. Each column of the panel tables of each panel 202, 204, 206, 208, and 210 may represent a field, while each row of the panel tables may be referred as a "result row" that represent data that are associated with a primary field value (e.g., the value in the far-left column) for the row as was described with respect to FIGS. 1A, 1B, and 1C.

That is, for the dashboard implementation illustrated here, the far-left field (e.g., far left column) of each panel 202, 204, 206, 208, and 210 is the primary field for each panel 202, 204, 206, 208, and 210. Each result row will include a primary field value (e.g., for the second row in panel 202, "France" is the primary field value since it is the value in the far-left column, which is the primary field). Each result row will further comprise data (e.g., data in the form of field values) associated with the primary field value "France." For example, the associated data in the second row of panel 202 include the "Events" field value of "37167" and other field values that are not visible in FIG. 2A and that are also associated with the primary field value (e.g., "France"). Note that at the top of each field (e.g., column) is the name of each field (e.g., for panel 202, "Country" and "Events" are the names of the two fields that are shown). These field headings or names (e.g., "Country" and "Events" in panel 202) may be selected or "clicked" by a user to execute a stack sorting operation on the panel table (e.g., re-sorting the result rows of the panel table based on the associated values of the selected field). For example, re-sorting of the result rows in panel 202 of FIG. 2A may be accomplished by clicking the "Events" heading for the far-right field (e.g., column), which may cause the re-sorting to be performed based on the "events" value for each row—e.g., the rows with the higher values for "events" field placed higher than those with lower values for the events field, or vice versa.

As with the panels 102, 104, 106, 108, and 110 of the dashboard instances 100a, 100b, and 100c of FIGS. 1A, 1B, and 1C, any of the displayed field values in the primary field (e.g., "Country" field) of panel 202 may be "clicked" to select or generate a filter condition that may be applied to the search query of panel 202 as well as to the search queries of the other panels 204, 206, 208, and 6010 of the dashboard instance 200a of FIG. 2A. For example, if the field value "United States" is selected in panel 202 under the primary field "Country," a filter condition for the "United States" for the country field will be applied to the search query of panel 202, as well as to the search queries of some or all of the other panels 204, 206, 208, and 210. That is, by adding the "United States" filter condition to the search queries of, for example, each panel 202, 204, 206, 208, and 210, each search query may be rerun to update the data to be included in their respective panels 202, 204, 206, 208, and 210, and therefore, more narrowly focus the search results. In some cases where the investigative dashboard is implemented using XML, the filter condition to be applied to the search queries of each panel 202, 204, 206, 208, and 210 may be achieved by passing and applying an XML token to the search queries of panels 202, 204, 206, 208, and 210.

Figure 2B:
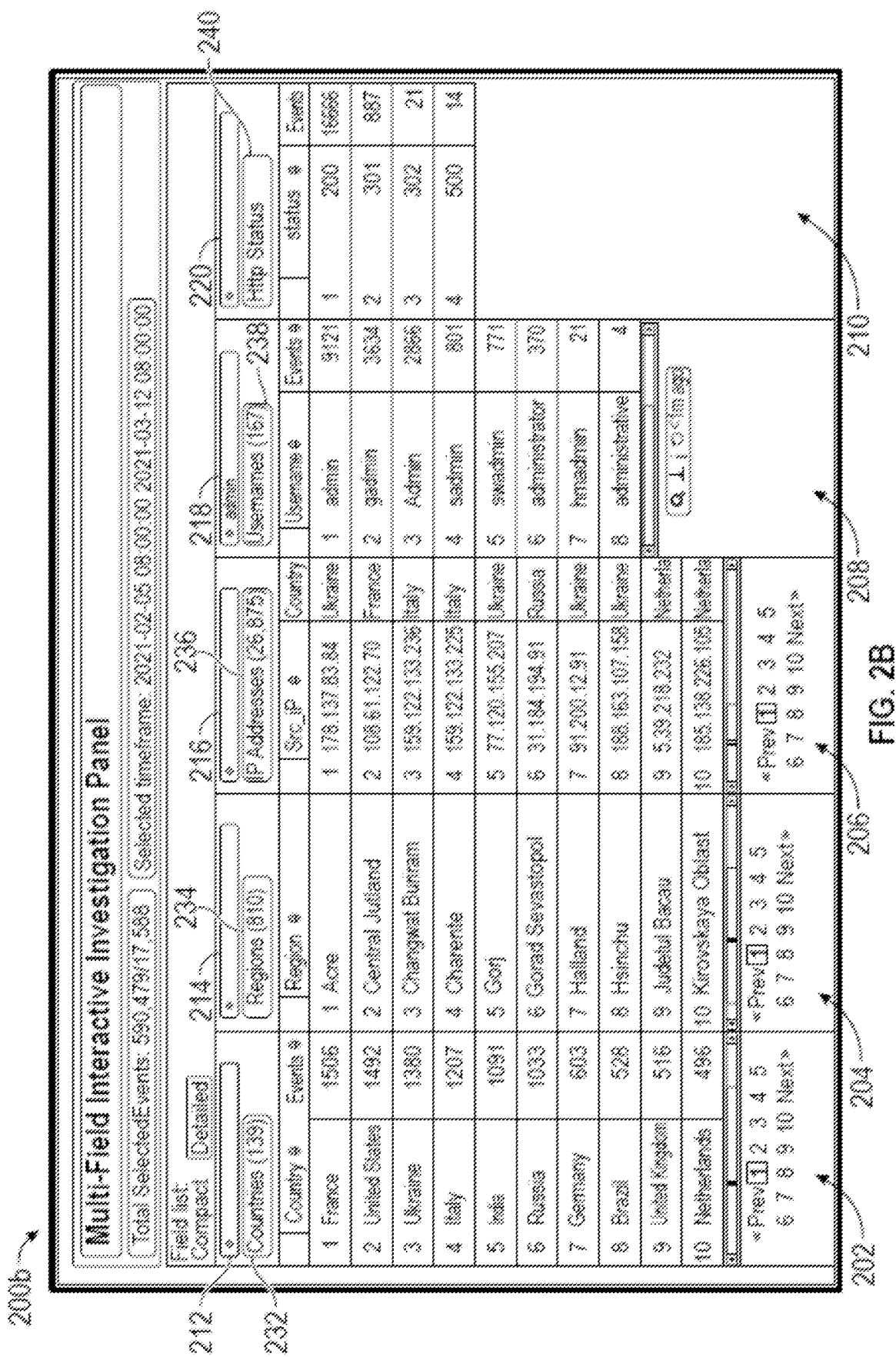
FIG. 2B illustrates a second instance of the second example dashboard that displays, at least partially, multiple independent panels, in accordance with some example implementations.

Near the top of each panel 202, 204, 206, 208, and 210 is a text field 212, 214, 216, 218, or 220. In various implementations, a text field 212, 214, 216, 218, or 220 may display a textual representation of a filter condition that has been generated for application (such as by selecting a primary field value as described above) and/or may be used to enter a text string that causes a filter condition to be created. For example, in FIG. 2B, a text string "admin" has been entered in text field 218 for panel 208 to create a filter condition that seeks data (e.g., field values) associated with usernames that include the text "admin." Thus, the text fields, such as text field 218, may be used to enter text strings used to conduct, for example, keyword searches in specific fields. FIG. 2B illustrates the dashboard instance 200b after the generated filter condition (e.g., seek data associated with a username that includes the text "admin") was applied to the default search queries for panels 202, 204, 2206, 208, and 210, and the updated search queries were re-run to generate updated data to populate the panel tables in panels 202, 204, 2206, 208, and 210. As a result, the data displayed through the panel tables in panels 202, 204, 2206, 208, and 210 in the dashboard instance 100b of FIG. 2B has been updated from the data previously displayed in the dashboard instance 200a of FIG. 2A.

Figure 2C:
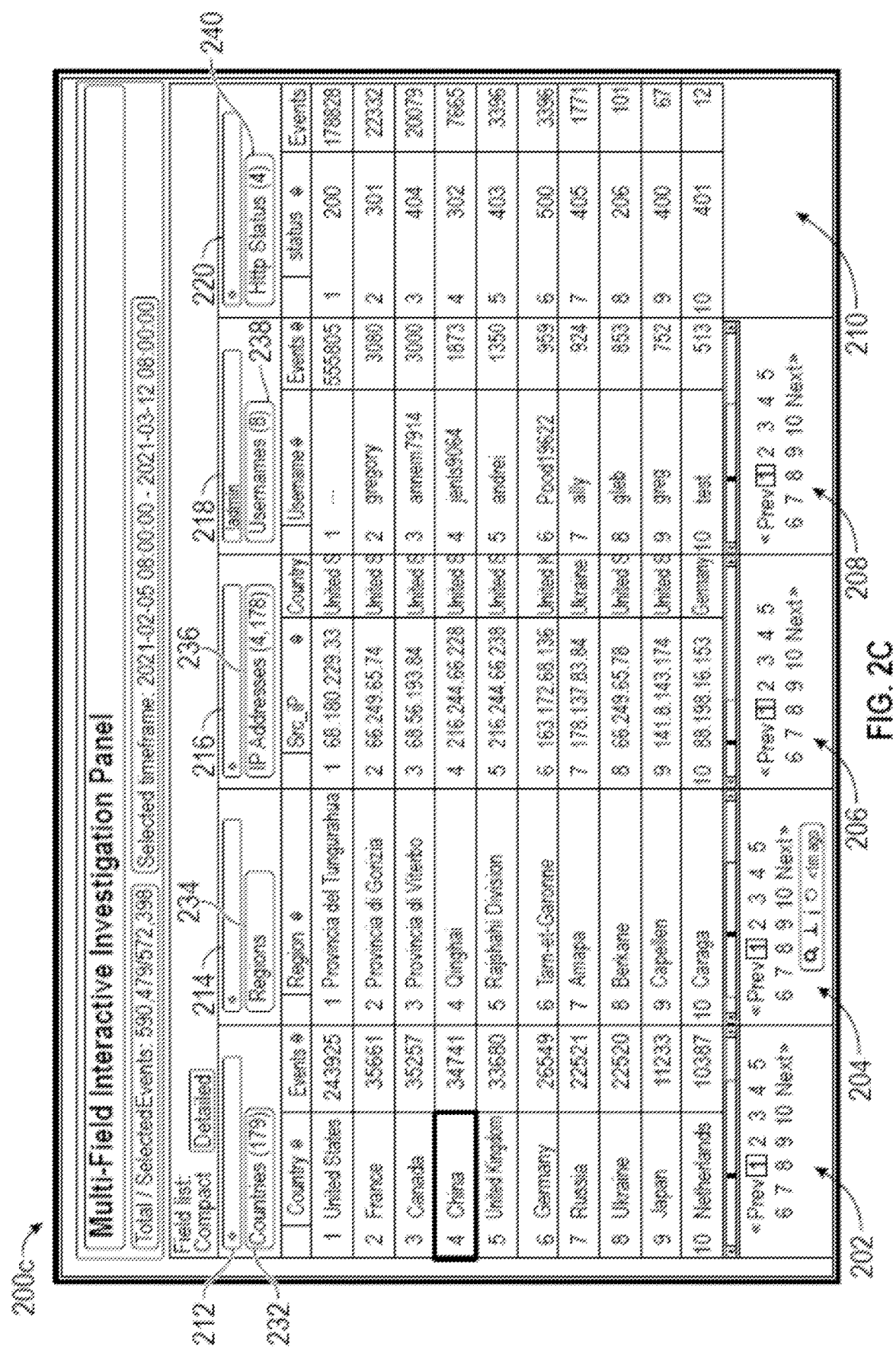
FIG. 2C illustrates a third instance of the second example dashboard that displays, at least partially, multiple independent panels, in accordance with some example implementations.

FIG. 2C illustrates another dashboard instance 200c that was generated after a new filter condition was created when user input in the form of a text string was entered through the text field 218 of panel 208 and after the queries for each panel 202, 204, 206, 208, and 210 were updated with the new filter condition and rerun. In particular, a new username filter was created after the text string "!admin" was entered in text field 218, which caused a new filter condition to be generated to seek data associated with usernames that do not include the text "admin." This new filter condition was then applied to the existing query of panel 208, as well as to the existing queries of the other panels 202, 204, 2206, and 210. In this case, the application of the new filter condition to panels 202, 204, 2206, 208, and 210 entailed replacing the previously applied filter condition (e.g., seeking data associated with usernames that include the text "admin") in the existing search queries of panels 202, 204, 2206, 208, and 210 with the new filter condition (e.g., seeking data associated with username field values that do not include the text "admin"). The updated queries for all of the panels 202, 204, 2206, 208, and 210 were then rerun to generate updated data used to replace the old data previously included in panels 202, 204, 2206, 208, and 210 of FIG. 2B.

FIG. 2D illustrates another dashboard instance 200d after another filter condition was generated and applied to panels 202, 204, 2206, 208, and 210 of the example investigative dashboard. In this case, the generation of another filter condition for application to, for example, panels 202, 204, 2206, 208, and 210 was in response to a user providing user input such as when the user clicked or selected one of the primary field values (e.g., "China") of panel 202. Note that as a result of user selecting the primary field value, China, the text field 212 shows a text string ("=China"). In the implementation illustrated in FIG. 2D, once the new "China" filter condition was generated, the new filter condition was applied to the existing queries associated with each of the panels 202, 204, 2206, 208, and 210, and the resulting updated queries were rerun to generate new data for populating the tables in panels 202, 204, 206, 208, and 210. In particular, after the primary field value of "China" was picked or "clicked" by the user, a "China" filter condition was generated (e.g., selected or created in various alternative implementations) and applied (e.g., added) to the existing query of panel 202, which included the original default query supplemented by the "!admin" username filter condition previously added. Thus, in this case, the new filter condition (e.g., Country=China) supplements the previous added filter condition (e.g., username=!admin—see text field 218 of FIG. 2D) rather than replace it. The new "China" filter is also applied/added to the existing queries (which include the default queries and the "!admin" username filter previously added to each of the default queries) of the other panels 204, 2206, 208, and 210. All of the updated queries were then rerun to generate new data for populating/updating the panels 202, 204, 2206, 208, and 210 as illustrated in FIG. 2D.

Figure 2E:
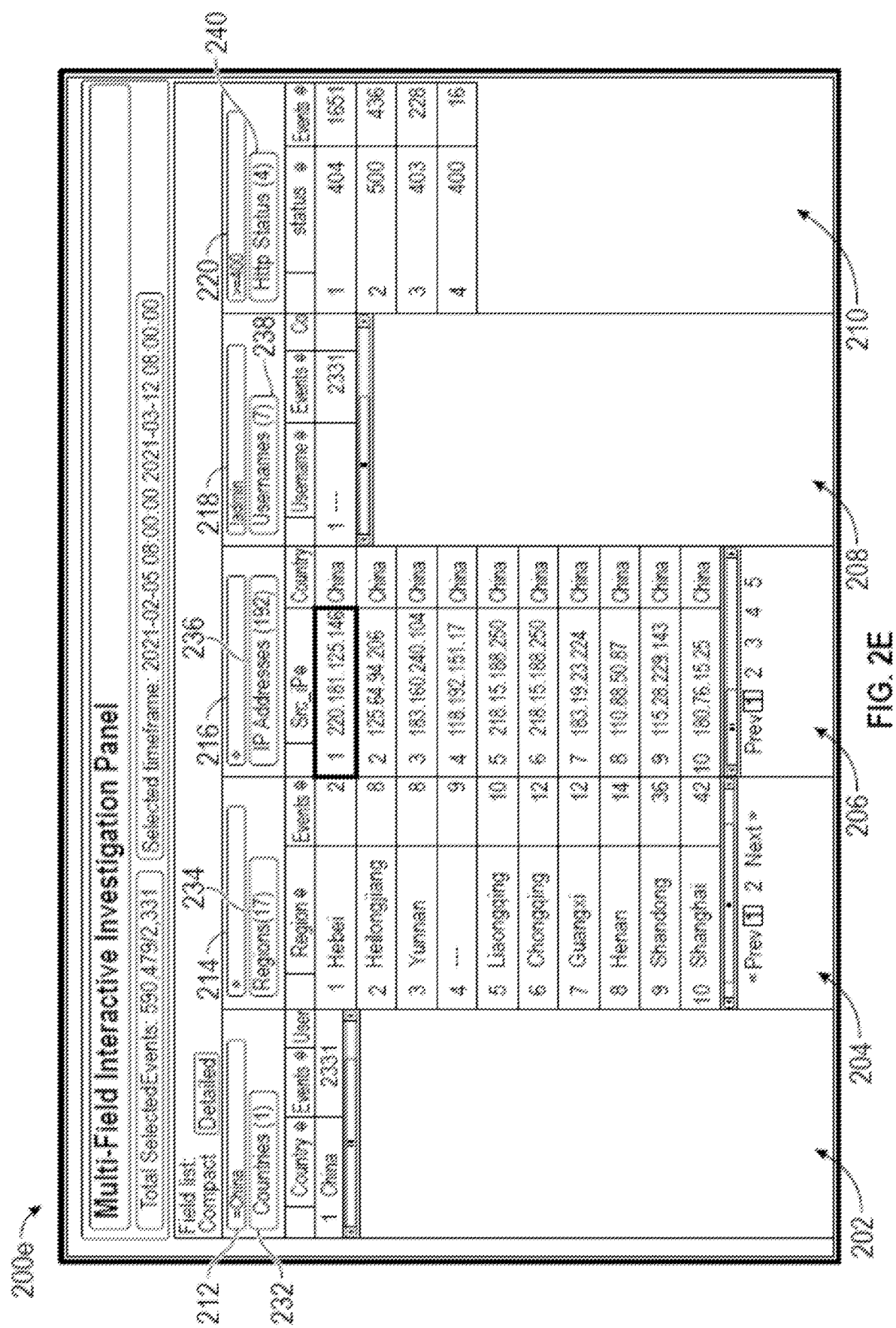
FIG. 2E illustrates a fifth instance of the second example dashboard that displays, at least partially, multiple independent panels, in accordance with some example implementations.

FIG. 2E illustrates yet another dashboard instance 200e after another filter condition was generated for application to panels 202, 204, 206, 208, and 210 of the investigative dashboard. The formation of another filter condition for application, in this case, was prompted when the user entered the text string ">=400" in the text field 220 in panel 210, which caused the generation of a filter condition designed to search for data associated with HTTP status of 400 or greater. Once the new HTTP status filter condition was generated, the new filter condition was applied to the existing queries associated with each of the panels 202, 204, 206, 208, and 210 and the updated queries for each panel 202, 204, 206, 208, and 210 were rerun to generate new data for populating the tables in panels 202, 204, 206, 208, and 210. In particular, after the new filter condition was generated, the new filter condition was applied (which, in this case, was added) to the existing query of panel 210 (which included the original default query supplemented by the "!admin" username filter condition and the "China" country filter condition previously added). The new filter was also applied/added to the existing queries (which includes the default queries that were supplemented with the "!admin" username filter condition and the "China" country filter condition that were previously added to each of the default queries) of the other panels 202, 204, 206, and 208. All of the updated queries were then rerun to generate new data that was used to populate/update the tables in panels 202, 204, 206, 208, and 210 as shown in FIG. 2E.

Figure 2F:
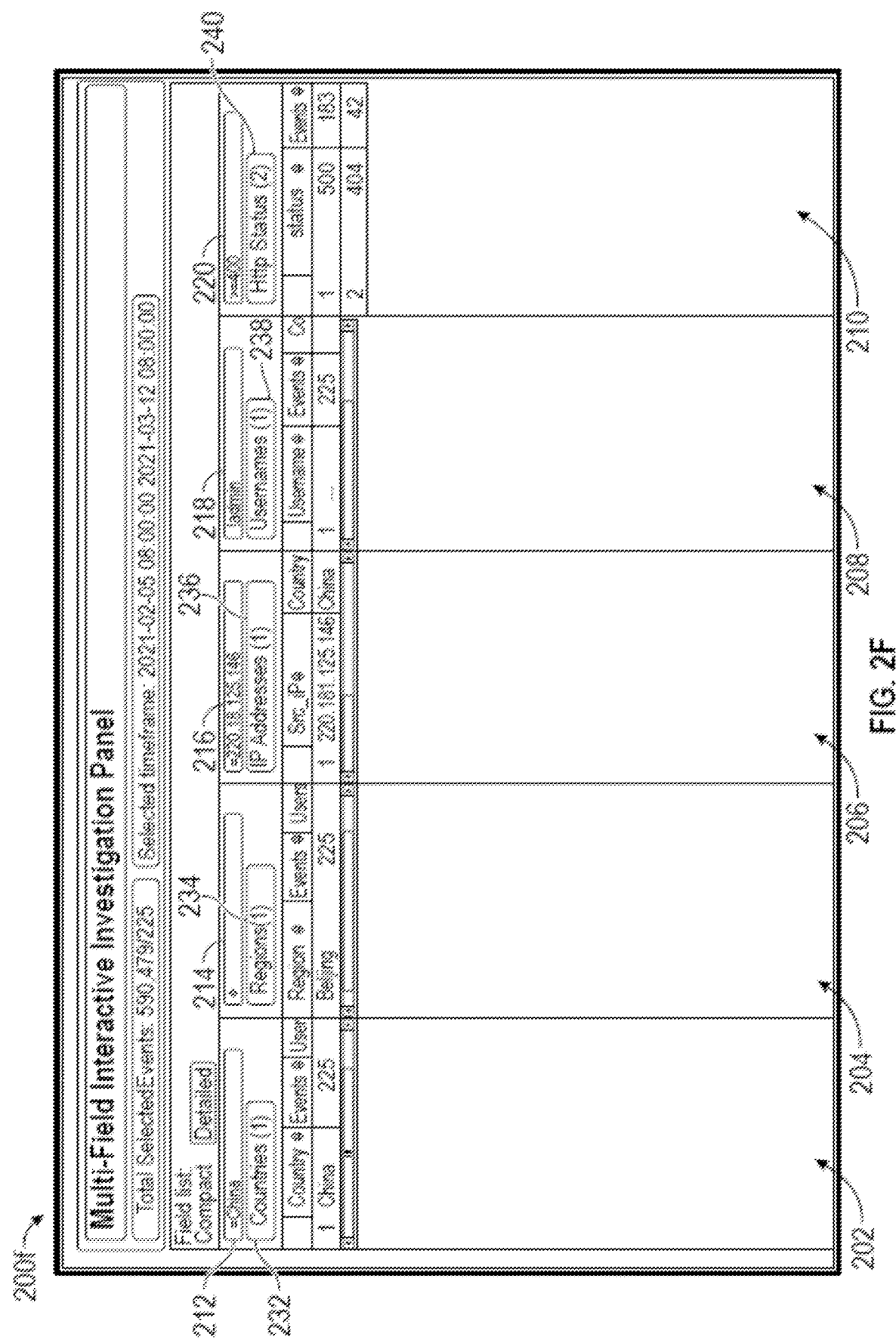
FIG. 2F illustrates a sixth instance of the second example dashboard that displays, at least partially, multiple independent panels, in accordance with some example implementations.

FIG. 2F illustrates yet another dashboard instance 200f after another filter condition was generated for application to panels 202, 204, 206, 208, and 210 of the investigative dashboard. In this case, the generation of another filter condition for application to panels 202, 204, 206, 208, and 210 was performed by selecting (e.g., "clicking") one of the primary field values (e.g., IP address "220.181.126.146") of panel 206. Note that text field 216 shows the textual representation ("=220.181.126.146") of the filter condition that was generated, which seeks out data associated with the IP address field value of "220.181.126.146." Once the new IP address filter condition was generated, the new filter condition was applied to the existing queries associated with each of the panels 202, 204, 206, 208, and 210, and the resulting updated queries were rerun to generate new data for populating the tables in panels 202, 204, 206, 208, and 210. In particular, after the primary field value of "220.181.126.146" was selected, a new IP address filter condition was applied/added to the existing query of panel 206. The new IP address filter is also applied/added to the existing queries of the other panels 204, 206, 208, and 210 to update the existing queries. All of the updated queries were then rerun to generate new data for populating/updating panels 202, 204, 206, 208, and 210 as illustrated in FIG. 2F.

Figure 3:
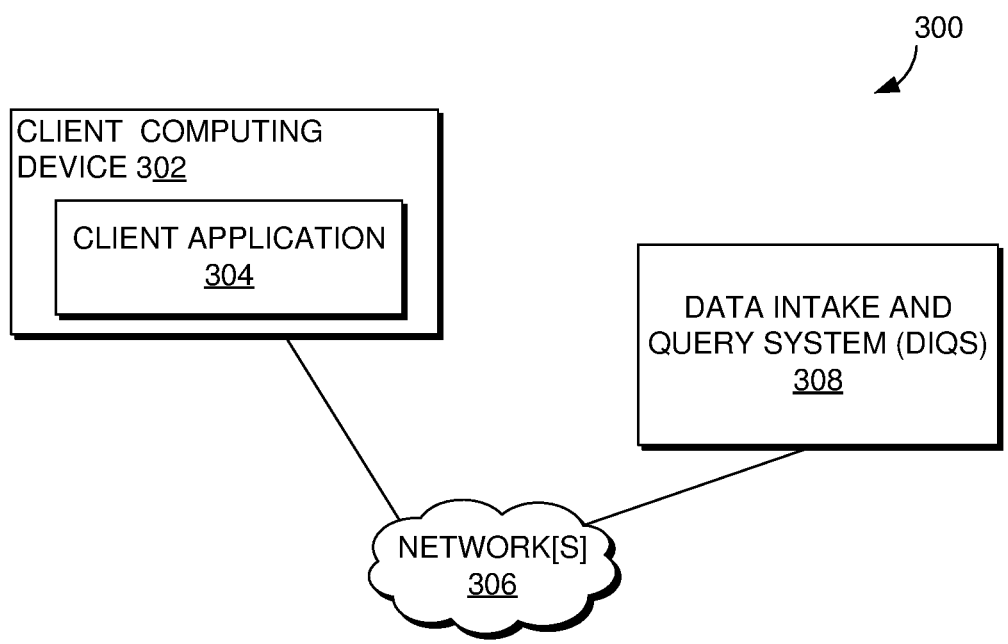
FIG. 3 is a block diagram of an example network computing environment, in accordance with some example implementations.

FIG. 3 is a block diagram of an example network computing environment 300 in accordance with example embodiments. As illustrated, the network computing environment 300 includes one or more networks 306 that may comprise one or more local area networks (LANs), wide area networks (WANs), cellular networks (e.g., LTE, HSPA, 3G, and other cellular technologies), and/or networks using any of wired, wireless, terrestrial microwave, or satellite links, and may include the public Internet. The network computing environment 300 further includes a data intake and query system (DIQS) 308 and a client computing device 302 including a client application 304.

In various implementations, the data intake and query system 308 of FIG. 3 generally corresponds to the data intake and query system 610 illustrated in FIG. 6, which will be described in greater detailer herein. Note that for ease of illustration and explanation, only a single client computing device 302 is illustrated in FIG. 3. However, and as one of ordinary skill in the art will recognize, in reality, many client computing devices 302 may be present in such a network computing environment 300. In various implementations, a client computing device 302, when executing the client application 304 (e.g., computer-readable instructions stored in a non-transitory computer-readable medium) may perform the various operations previously described including, for example, presenting a dashboard with multiple independent panels, generating filter conditions based on user input, applying the filter conditions to the queries associated with the independent panels and rerunning the updated queries, and so forth that were previously described above. More particularly, the client device 302 may implement at least some of the operations connected to process 500 of FIG. 5.

Figure 4:
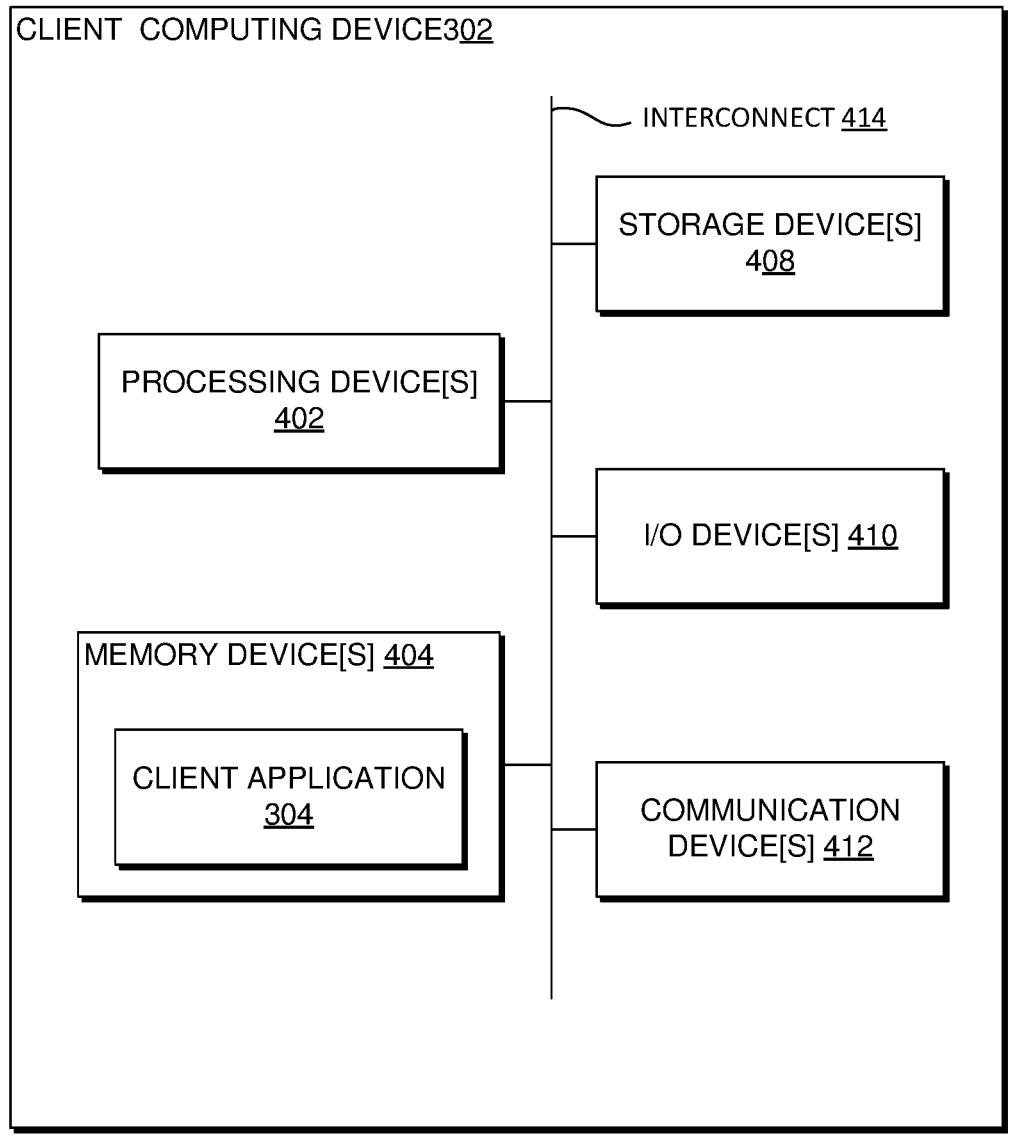
FIG. 4 is a high-level block diagram of the client computing device illustrated in FIG. 3, in accordance with some example implementations.

FIG. 4 is a high-level block diagram of the client computing device 302 of FIG. 3 in accordance with some example implementations. More particularly, FIG. 4 illustrates at least some of the example hardware components that may be included in a client computing device 302. In some embodiments, the client computing device 302, may be used to implement one or more operations of process 500 of FIG. 5 to be described herein.

As illustrated, the client device 302 includes one or more processing devices 402, one or more memory devices 404, one or more storage devices 408, one or more input/output (I/O) devices 410, and one or more communication devices 412, all coupled together via an interconnect 414. As illustrated, the one or more memory devices 404 may store a client application 304, which may also be stored in one or more storage devices 408, for executing among other things the various operations of process 500 of FIG. 5. That is, the processes and logic flows described above with respect to, for example, process 500, as well as some of the other processes described above, can be performed by the one or more processing devices 402 executing the client application 304 (e.g., one or more computer-readable instructions).

The interconnect 414 may be or include one or more conductive traces, buses, point-to-point connections, controllers, adapters, and/or other connection devices. The one or more processing devices 402 may include, for example, one or more processors, digital signal processors (DSPs), controllers, field programmable gate array (FPGA), application specific integrated circuit (ASIC), or the like, or any combination thereof. The one or more memory devices 404 may include one or more physical storage devices, which may be in the form of random access memory (RAM), read-only memory (ROM), flash memory, miniature hard disk drive, or other suitable types of storage device, or a combination of such devices. The one or more storage devices 408 may include one or more hard drives, digital versatile disks (DVDs), flash memories, or the like. As noted above, each of the memory devices 404 and/or storage devices 408 may store, individually or collectively, data and instructions that configure the one or more processing devices 402 to execute operations to implement the processes and operations described above with respect to, for example, process 500. Further, each of the memory devices 404 and/or storage devices 408 may store, individually or collectively, a Java Script for converting a query string inputted by a user into an expanded query, such as a search processing language (SPL) query, for transmission to, for example, a DIQS 308.

The one or more communication devices 412 may include, for example, a network interface card (NIC), an Ethernet adapter, cable modem, Wi-Fi adapter, cellular transceiver, baseband processor, or the like, or a combination thereof. The one or more I/O devices 410 may include, for example, a display (which may be a touch screen display), audio speaker, keyboard, mouse, or other pointing device, microphone, camera, and so forth.

Figure 5:
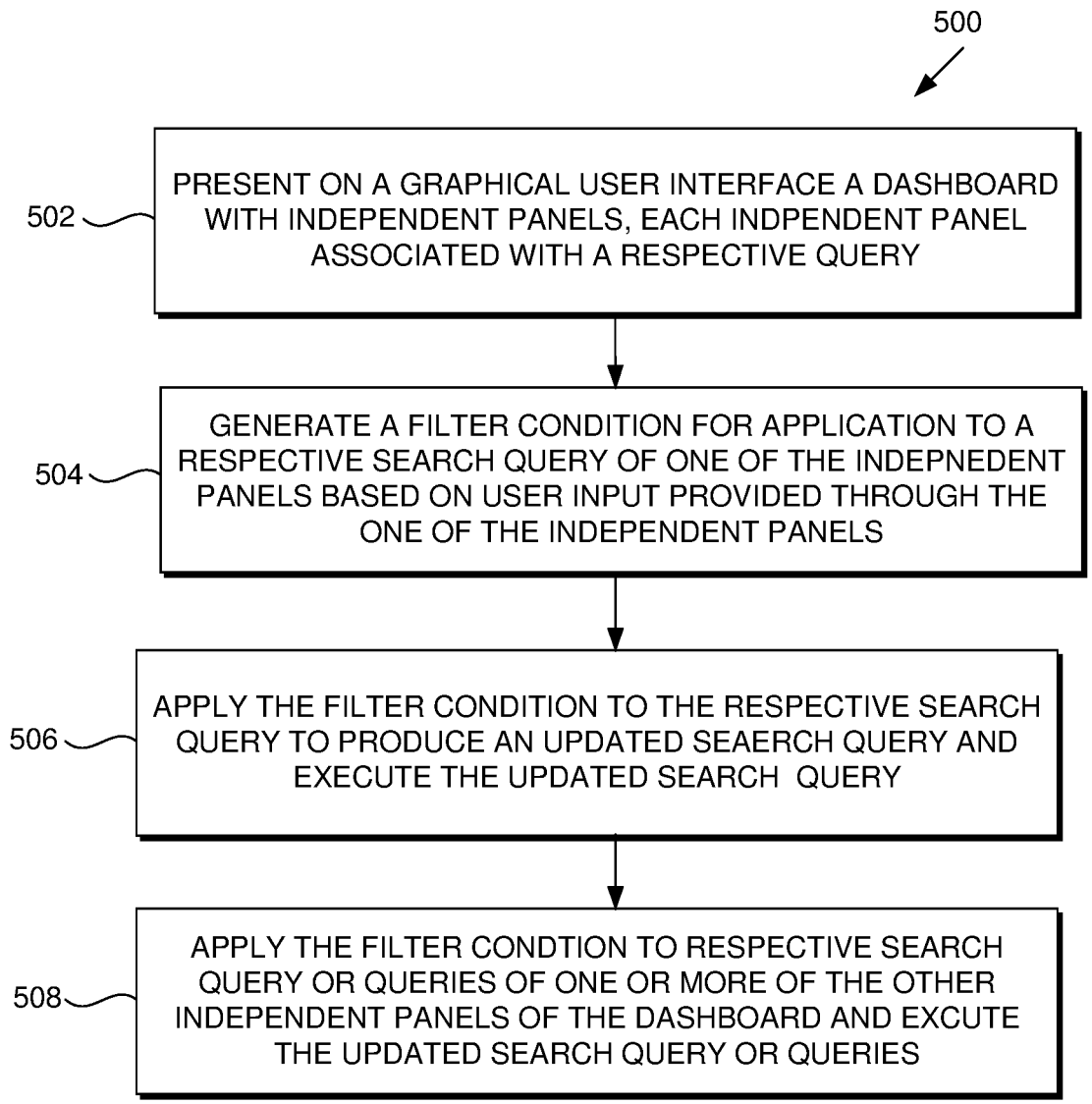
FIG. 5 is a flow chart of an example process for updating search queries of independent panels of a dashboard based on user input provided through one of the panels and executing the updated search queries to update the independent panels, in accordance with some example implementations.

FIG. 5 is a flow chart of an example process 500 for updating search queries of independent panels of a dashboard based on user input provided through one of the panels and executing the updated search queries to update the independent panels. In various implementations, the operations illustrated in FIG. 5 may be implemented by, for example, the client computing device 302 of FIGS. 3 and 4 executing, for example, a client application 304. In order to facilitate understanding of process 500, the following discussion of process 500 may reference the various systems and features described above and/or illustrated in FIGS. 1A, 1B, 1C, 2A, 2B, 2C, 2D, 2E, 2F, 3, and 4.

The example process 500 may begin at block 502 when a dashboard with independent panels on a graphical user interface is presented, by a client computing device, where each independent panel is associated with a respective query. For example, presenting (e.g., displaying), by a client computing device 302, on a graphical user interface, a dashboard (e.g., dashboard instance 200*) with independent panels 202, 204, 206, 208, and 210, each independent panel 202, 204, 206, 208, and 210 is associated with a respective search query and is generated on the dashboard based, at least in part, on an output produced as a result of executing the independent panel's associated search query In some implementations, the respective search queries of the independent panels 202, 204, 206, 208, and 210 that may be executed to generate the output for generating the independent panels 202, 204, 206, 208, and 210 are the default search queries of the independent panels 202, 204, 206, 208, and 210. For these implementations, such default search queries may be executed at the start of a user dashboard session when the dashboard is activated/displayed. In some cases, each independent panel 202, 204, 206, 208, and 210 may be associated with a respective query that is different from the respective queries of the other independent panels 202, 204, 206, 208, and 210 of the dashboard (e.g., dashboard instances 200* of FIGS. 2A to 2F). In some implementations, each of at least some of the independent panels 202, 204, 206, 208, and 210 of the dashboard that is presented includes a table, the table of an independent panel 202, 204, 206, 208, or 210 is populated by data outputted as a result of executing the associated search query of the independent panel 202, 204, 206, 208, or 210.

In various implementations, each of at least some of the independent panels 202, 204, 206, 208, and 210 that is presented includes a table, where the table of an independent panel 202, 204, 206, 208, or 210 is populated by data outputted as a result of executing the associated search query of the independent panel 202, 204, 206, 208, or 210 and can be stack sorted independent of the other tables of the other independent panels. In some cases, each of at least some of the independent panels 202, 204, 206, 208, and/or 210 that are presented may include a table, where the table of an independent panel 202, 204, 206, 208, or 210 is populated by data outputted as a result of executing the associated search query of the independent panel 202, 204, 206, 208, or 210 and includes a primary field for displaying primary field values that are selectable for generating a filtering condition (e.g., seeking data associated with primary field value of "China" for countries). In some cases, each of at least some of the independent panels 202, 204, 206, 208, and 210 to be presented may include a table with multiple fields (e.g., columns) and a selection window 232, 234, 236, 238, or 240 for designating one of the fields of the independent panel 202, 204, 206, 208, or 210 as a primary field, where the table of an independent panel 202, 204, 206, 208, or 210 is populated by data outputted as a result of executing the associated search query of the independent panel 202, 204, 206, 208, or 210.

In various implementations, one or more of the independent panels 202, 204, 206, 208, and 210 of the dashboard that is presented may each include a text field 212, 214, 216, 218, or 220, the text field 212, 214, 216, 218, or 220 of an independent panel 202, 204, 206, 208, or 210 for displaying a textual representation of a filter condition generated through the independent panel 202, 204, 206, 208, or 210 (e.g., showing a filter condition that was generated when a user selected a primary field value, such as "China" for country field in FIG. 2D, that caused the China filter condition to be generated) and for entering user input (e.g., text string) for generating a filter condition through the independent panel 202, 204, 206, 208, or 210 (e.g., a user enters a text string, such as "=>400" in text field 220 as illustrated in FIG. 2E to generate the Http status filter condition).

Referring back to FIG. 5, at block 504 a filter condition for application to a respective search query of one of the independent panels may be generated based on user input provided through the one of the independent panels. For example, generating, by the client computing device 302, a filter condition for application to a respective search query of one of the independent panels 202, 204, 206, 208, or 210, the generation based on user input (e.g., selection of a primary field value or entry of a text string through a text field 112, 114, 116, 118, or 120) provided through the one of the independent panels 202, 204, 206, 208, or 210. In various implementations, the filter condition that is generated may comprise a search string that is based, at least in part, on the user input. In some cases, the generation of a filter condition may include generating a search string that is embodied in an Extensible Markup Language (XML) token. In some cases, the filter condition that is generated is based, at least in part, on the user input and based on a designated primary field of the independent panel 202, 204, 206, 208, or 210 through which the user input was entered. For example, in FIG. 2D a filter condition was generated to seek data (e.g., field values) associated with country field value of "China" based on the user input provided by a user when a user selected or "clicked" the primary field value of "China" under the primary field of "country."

At block 506, the filter condition that was generated is applied to the respective search query of the independent panel through which the user input was provided through to produce an updated search query for the independent query that may be executed to update the independent query. For example, applying, by the client computing device 302, the filter condition (e.g., seek data associated with country field=China) to the respective search query of the one of the independent panels (e.g., independent panel 202 in FIG. 2D) to produce an updated search query and execute the updated search query to update the one of the independent panels (e.g., independent panel 202, which has been updated in FIG. 3D). In some implementations, the application, by the client computing device 302, of the filter condition to the respective search query of the one of the independent panels (e.g., independent panel 208 in FIG. 2B) is by applying the filter condition (e.g., seek data associated with username=*admin*) to a default search query of the one of the independent panels (e.g., independent panel 208). For these implementations, a default search query for an independent panel 202, 204, 206, 208, or 210 may be the preset search query for the independent panel 202, 204, 206, 208, or 210 that may be executed at the start of each user dashboard session.

In some implementations, the application of the filter condition to the respective search query of the one of the independent panels 202, 204, 206, 208, or 210 includes adding a search string to the respective search query to produce the updated search query. For example, in FIG. 2D, the filter condition, country=China, is added to the existing search query for the independent panel 202. In some cases, the application of the filter condition to the respective search query of the one of the independent panels 202, 204, 206, 208, or 210 includes adding a search string to the respective search query to produce the updated search query, and where the respective search query includes a default search query that was previously updated with one or more previously provided search strings (e.g., previously applied filter conditions). For example, in FIG. 2D, the search string, country=China (which seeks data associated with a country field value of "China") was added to the existing search queries of all the panels 202, 204, 206, 208, and 210 that were previously updated with the search string, username=!admin.

In some cases, the application of a filter condition to the respective search query of the one of the independent panels 202, 204, 206, 208, or 210 includes substituting a prior added search string included in the respective search query of the one of the independent panels 202, 204, 206, 208, or 210 with a replacement search string to produce the updated search query. For example, in FIG. 2B, the search string, username=admin (which seeks data associated with username field values that include the text "admin") was added to respective search query of panel 208, which was then subsequently replaced in FIG. 2C with the search string, username=!adamin (which seeks data associated with username field values that does not include the text "admin").

Referring back to FIG. 5, at block 508, the filter condition that was generated is applied to respective search query or queries of one or more of the other independent panels of the dashboard and the updated search query or queries are executed. For example, applying, by the client computing device 302, the filter condition to respective search query or queries of one or more of the other independent panels (e.g., one or more of the independent panels other than the one of the independent panel through which the user input was provided to generate the filter condition) of the dashboard to produce updated search query or queries for the one or more of the other independent panels and execute the updated search query or queries to update the one or more of the other independent panels. In some cases, the application of the filter condition to the respective search query or queries of one or more of the other independent panels (e.g., one or more independent panels 202, 204, 206, 208, and/or 210 of FIGS. 2A to 2F) of the dashboard to produce updated search query or queries for the one or more of the other independent panels includes applying the filter condition to the respective search queries of all the other independent panels of the dashboard to produce updated search queries for all the other independent panels. As a result, all of the independent panels 202, 204, 206, 208, and 210 of the dashboard may be updated with the generated filter condition.

In some cases, the application of the filter condition to the respective search query or queries of one or more of the other independent panels 202, 204, 206, 208, and/or 210 of the dashboard to produce updated search query or queries for the one or more of the other independent panels 202, 204, 206, 208, and/or 210 includes applying the filter condition that is embodied in an Extensible Markup Language (XML) token to the respective search query or queries of the one or more of the other independent panels 202, 204, 206, 208, and/or 210. In some cases, the execution of the updated search query or queries to update the one or more of the other independent panels 202, 204, 206, 208, and/or 210 includes transmitting to a data intake and query system the updated query or queries for the one or more of the independent panels 202, 204, 206, 208, and/or 210 and receiving from the data intake and query system (DIQS), in response to the transmission of the updated query or queries, data to populate and/or configure the one or more of the other independent panels 202, 204, 206, 208, and/or 210. In some embodiments, the updated query or queries transmitted to the DIQ may be in the form of a native query language of the DIQS, such as Search Processing Language (SPL) developed by Splunk Inc. of San Francisco, California.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 6:
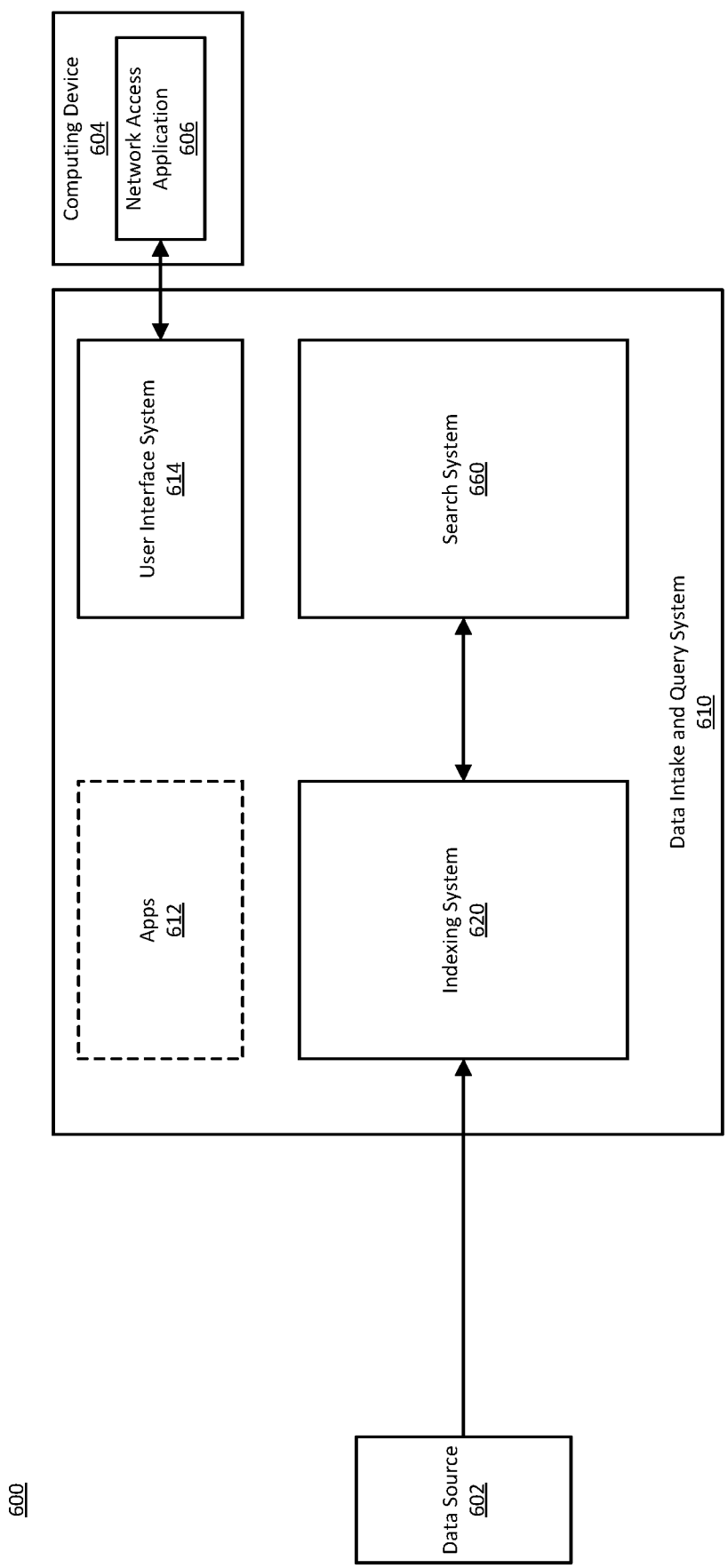
FIG. 6 is a block diagram illustrating an example computing environment that includes a data intake and query system, in accordance with some example implementations.

FIG. 6 is a block diagram illustrating an example computing environment 600 that includes a data intake and query system 610. The data intake and query system 610 obtains data from a data source 602 in the computing environment 600, and ingests the data using an indexing system 620. A search system 660 of the data intake and query system 610 enables users to navigate the indexed data. Though drawn with separate boxes in FIG. 6, in some implementations the indexing system 620 and the search system 660 can have overlapping components. A computing device 604, running a network access application 606, can communicate with the data intake and query system 610 through a user interface system 614 of the data intake and query system 610. Using the computing device 604, a user can perform various operations with respect to the data intake and query system 610, such as administration of the data intake and query system 610, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 610 can further optionally include apps 612 that extend the search, analytics, and/or visualization capabilities of the data intake and query system 610.

The data intake and query system 610 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 610 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 610 can be executed on a single computing device, or execution of the program code can be distributed over multiple computing devices. For example, the program code can include instructions for both indexing and search components (which may be part of the indexing system 620 and/or the search system 660, respectively), which can be executed on a computing device that also provides the data source 602. As another example, the program code can be executed on one computing device, where execution of the program code provides both indexing and search components, while another copy of the program code executes on a second computing device that provides the data source 602. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 602 of the computing environment 600 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 602 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 620 obtains machine date from the data source 602 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 620 does not require prior knowledge of the structure of incoming data (e.g., the indexing system 620 does not need to be provided with a schema describing the data). Additionally, the indexing system 620 retains a copy of the data as it was received by the indexing system 620 such that the original data is always available for searching (e.g., no data is discarded, though, in some examples, the indexing system 620 can be configured to do so).

The search system 660 searches the data stored by the indexing 620 system. As discussed in greater detail below, the search system 660 enables users associated with the computing environment 600 (and possibly also other users) to navigate the data, generate reports, and visualize search results in "dashboards" output using a graphical interface. Using the facilities of the search system 660, users can obtain insights about the data, such as retrieving events from an index, calculating metrics, searching for specific conditions within a rolling time window, identifying patterns in the data, and predicting future trends, among other examples. To achieve greater efficiency, the search system 660 can apply map-reduce methods to parallelize searching of large volumes of data. Additionally, because the original data is available, the search system 660 can apply a schema to the data at search time. This allows different structures to be applied to the same data, or for the structure to be modified if or when the content of the data changes. Application of a schema at search time may be referred to herein as a late-binding schema technique.

The user interface system 614 provides mechanisms through which users associated with the computing environment 600 (and possibly others) can interact with the data intake and query system 610. These interactions can include configuration, administration, and management of the indexing system 620, initiation and/or scheduling of queries that are to be processed by the search system 660, receipt or reporting of search results, and/or visualization of search results. The user interface system 614 can include, for example, facilities to provide a command line interface or a web-based interface.

Users can access the user interface system 614 using a computing device 604 that communicates with data intake and query system 610, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 600. For example, a person can log in as a particular user and, using the user's digital information, can access the data intake and query system 610. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 604 can provide a human-machine interface through which a person can have a digital presence in the computing environment 600 in the form of a user. The computing device 604 is an electronic device having one or more processors and a memory capable of storing instructions for execution by the one or more processors. The computing device 604 can further include input/output (I/O) hardware and a network interface. Applications executed by the computing device 604 can include a network access application 606, such as a web browser, which can use a network interface of the client computing device 604 to communicate, over a network, with the user interface system 614 of the data intake and query system #A110. The user interface system 614 can use the network access application 606 to generate user interfaces that enable a user to interact with the data intake and query system #A110. A web browser is one example of a network access application. A shell tool can also be used as a network access application. In some examples, the data intake and query system 610 is an application executing on the computing device 606. In such examples, the network access application 606 can access the user interface system 614 without going over a network.

The data intake and query system 610 can optionally include apps 612. An app of the data intake and query system 610 is a collection of configurations, knowledge objects (a user-defined entity that enriches the data in the data intake and query system 610), views, and dashboards that may provide additional functionality, different techniques for searching the data, and/or additional insights into the data. The data intake and query system 610 can execute multiple applications simultaneously. Example applications include an information technology service intelligence application, which can monitor and analyze the performance and behavior of the computing environment 600, and an enterprise security application, which can include content and searches to assist security analysts in diagnosing and acting on anomalous or malicious behavior in the computing environment 600.

Though FIG. 6 illustrates only one data source, in practical implementations, the computing environment 600 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 600, the data intake and query system 610 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 600 can include on-prem and cloud-based computing resources, or only cloud-based resources. For example, an entity may have on-prem computing devices and a private cloud. In this example, the entity operates the data intake and query system 610 and can choose to execute the data intake and query system 610 on an on-prem computing device or in the cloud. In another example, a provider entity operates the data intake and query system 610 in a public cloud and provides the functionality of the data intake and query system 610 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 610. In some implementations, the entity providing the data intake and query system 610 is itself subscribing to the cloud services of a cloud service provider. As an example, a first entity provides computing resources under a public cloud service model, a second entity subscribes to the cloud services of the first provider entity and uses the cloud computing resources to operate the data intake and query system 610, and a third entity can subscribe to the services of the second provider entity in order to use the functionality of the data intake and query system 610. In this example, the data sources are associated with the third entity, users accessing the data intake and query system 610 are associated with the third entity, and the analytics and insights provided by the data intake and query system 610 are for purposes of the third entity's operations.

Figure 7:
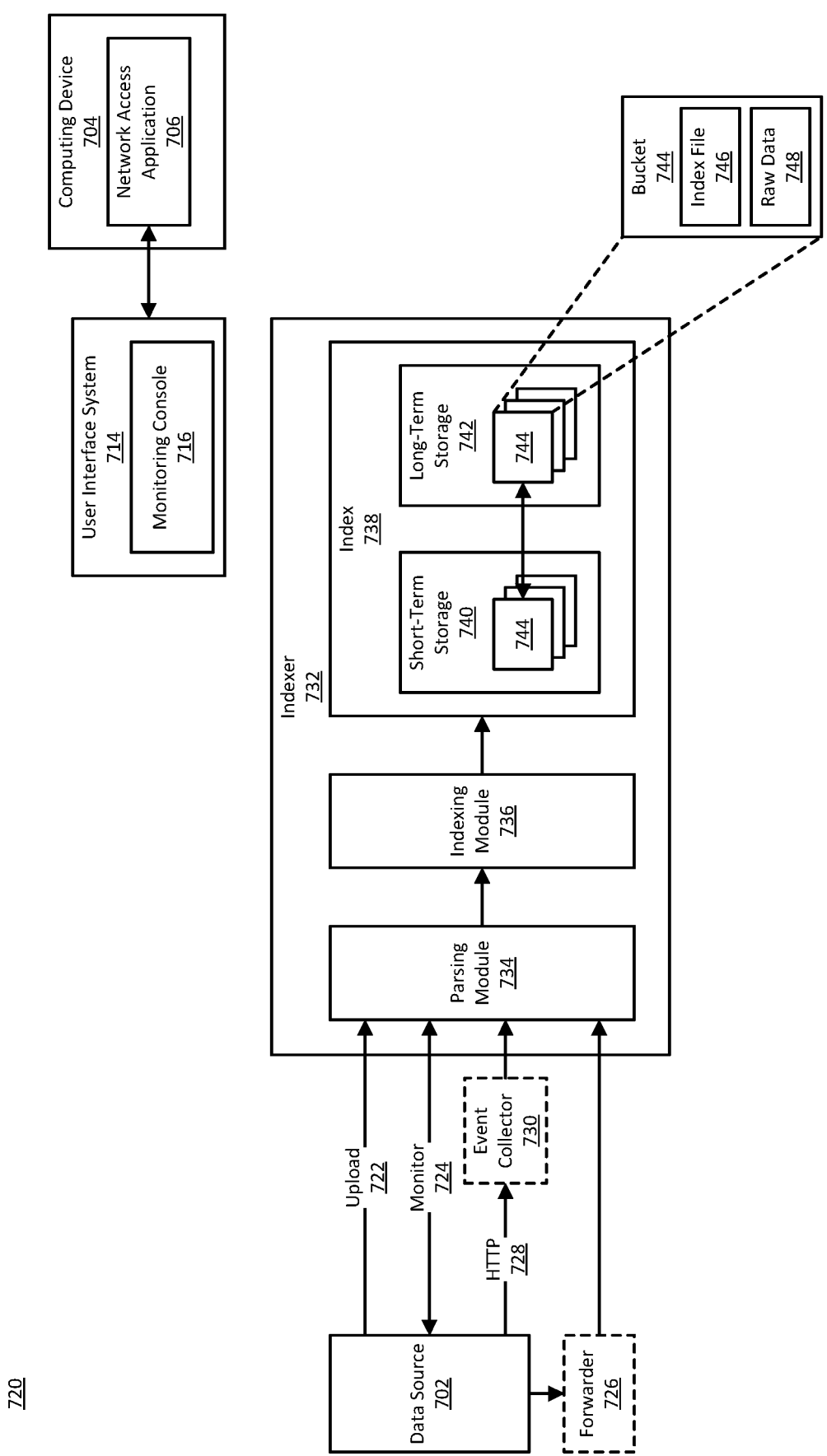
FIG. 7 is a block diagram illustrating in greater detail an example of an indexing system of a data intake and query system, such as the data intake and query system illustrated in FIG. 6, in accordance with some example implementations.

FIG. 7 is a block diagram illustrating in greater detail an example of an indexing system 720 of a data intake and query system, such as the data intake and query system 610 of FIG. 6. The indexing system 720 of FIG. 7 uses various methods to obtain machine data from a data source 702 and stores the data in an index 738 of an indexer 732. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 720 enables the data intake and query system to obtain the machine data produced by the data source 702 and to store the data for searching and retrieval.

Users can administer the operations of the indexing system 720 using a computing device 704 that can access the indexing system 720 through a user interface system 714 of the data intake and query system. For example, the computing device 704 can be executing a network access application 706, such as a web browser or a terminal, through which a user can access a monitoring console 716 provided by the user interface system 714. The monitoring console 716 can enable operations such as: identifying the data source 702 for data ingestion; configuring the indexer 732 to index the data from the data source 732; configuring a data ingestion method; configuring, deploying, and managing clusters of indexers; and viewing the topology and performance of a deployment of the data intake and query system, among other operations. The operations performed by the indexing system 720 may be referred to as "index time" operations, which are distinct from "search time" operations that are discussed further below.

The indexer 732, which may be referred to herein as a data indexing component, coordinates and performs most of the index time operations. The indexer 732 can be implemented using program code that can be executed on a computing device. The program code for the indexer 732 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 732. In some implementations, the indexer 732 executes on the computing device 704 through which a user can access the indexing system 720. In some implementations, the indexer 732 executes on a different computing device than the illustrated computing device 704.

The indexer 732 may be executing on the computing device that also provides the data source 702 or may be executing on a different computing device. In implementations wherein the indexer 732 is on the same computing device as the data source 702, the data produced by the data source 702 may be referred to as "local data." In other implementations the data source 702 is a component of a first computing device and the indexer 732 executes on a second computing device that is different from the first computing device. In these implementations, the data produced by the data source 702 may be referred to as "remote data." In some implementations, the first computing device is "on-prem" and in some implementations the first computing device is "in the cloud." In some implementations, the indexer 732 executes on a computing device in the cloud and the operations of the indexer 732 are provided as a service to entities that subscribe to the services provided by the data intake and query system.

For a given data produced by the data source 702, the indexing system 720 can be configured to use one of several methods to ingest the data into the indexer 732. These methods include upload 722, monitor 724, using a forwarder 726, or using HyperText Transfer Protocol (HTTP 728) and an event collector 730. These and other methods for data ingestion may be referred to as "getting data in" (GDI) methods.

Using the upload 722 method, a user can specify a file for uploading into the indexer 732. For example, the monitoring console 716 can include commands or an interface through which the user can specify where the file is located (e.g., on which computing device and/or in which directory of a file system) and the name of the file. The file may be located at the data source 702 or maybe on the computing device where the indexer 732 is executing. Once uploading is initiated, the indexer 732 processes the file, as discussed further below. Uploading is a manual process and occurs when instigated by a user. For automated data ingestion, the other ingestion methods are used.

The monitor 724 method enables the indexing system 702 to monitor the data source 702 and continuously or periodically obtain data produced by the data source 702 for ingestion by the indexer 732. For example, using the monitoring console 716, a user can specify a file or directory for monitoring. In this example, the indexing system 702 can execute a monitoring process that detects whenever the file or directory is modified and causes the file or directory contents to be sent to the indexer 732. As another example, a user can specify a network port for monitoring. In this example, a monitoring process can capture data received at or transmitting from the network port and cause the data to be sent to the indexer 732. In various examples, monitoring can also be configured for data sources such as operating system event logs, performance data generated by an operating system, operating system registries, operating system directory services, and other data sources.

Monitoring is available when the data source 702 is local to the indexer 732 (e.g., the data source 702 is on the computing device where the indexer 732 is executing). Other data ingestion methods, including forwarding and the event collector 730, can be used for either local or remote data sources.

A forwarder 726, which may be referred to herein as a data forwarding component, is a software process that sends data from the data source 702 to the indexer 732. The forwarder 726 can be implemented using program code that can be executed on the computer device that provides the data source 702. A user launches the program code for the forwarder 726 on the computing device that provides the data source 702. The user can further configure the forwarder 726, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 726 can provide various capabilities. For example, the forwarder 726 can send the data unprocessed or can perform minimal processing on the data before sending the data to the indexer 732. Minimal processing can include, for example, adding metadata tags to the data to identify a source, source type, and/or host, among other information, dividing the data into blocks, and/or applying a timestamp to the data. In some implementations, the forwarder 726 can break the data into individual events (event generation is discussed further below) and send the events to a receiver. Other operations that the forwarder 726 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 730 provides an alternate method for obtaining data from the data source 702. The event collector 730 enables data and application events to be sent to the indexer 732 using HTTP 728. The event collector 730 can be implemented using program code that can be executing on a computing device. The program code may be a component of the data intake and query system or can be a standalone component that can be executed independently of the data intake and query system and operates in cooperation with the data intake and query system.

To use the event collector 730, a user can, for example using the monitoring console 716 or a similar interface provided by the user interface system 714, enable the event collector 730 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 702 as an alternative method to using a username and password for authentication.

To send data to the event collector 730, the data source 702 is supplied with a token and can then send HTTP 728 requests to the event collector 730. To send HTTP 728 requests, the data source 702 can be configured to use an HTTP client and/or to use logging libraries such as those supplied by Java, JavaScript, and .NET libraries. An HTTP client enables the data source 702 to send data to the event collector 730 by supplying the data, and a Uniform Resource Identifier (URI) for the event collector 730 to the HTTP client. The HTTP client then handles establishing a connection with the event collector 730, transmitting a request containing the data, closing the connection, and receiving an acknowledgment if the event collector 730 sends one. Logging libraries enable HTTP 728 requests to the event collector 730 to be generated directly by the data source. For example, an application can include or link a logging library, and through functionality provided by the logging library manage establishing a connection with the event collector 730, transmitting a request, and receiving an acknowledgement.

An HTTP 728 request to the event collector 730 can contain a token, a channel identifier, event metadata, and/or event data. The token authenticates the request with the event collector 730. The channel identifier, if available in the indexing system 720, enables the event collector 730 to segregate and keep separate data from different data sources. The event metadata can include one or more key-value pairs that describe the data source 702 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 730 extracts events from HTTP 728 requests and sends the events to the indexer 732. The event collector 730 can further be configured to send events to one or more indexers. Extracting the events can include associating any metadata in a request with the event or events included in the request. In these implementations, event generation by the indexer 732 (discussed further below) is bypassed, and the indexer 732 moves the events directly to indexing. In some implementations, the event collector 730 extracts event data from a request and outputs the event data to the indexer 732, and the indexer generates events from the event data. In some implementations, the event collector 730 sends an acknowledgement message to the data source 702 to indicate that the event collector 730 has received a particular request form the data source 702, and/or to indicate to the data source 702 that events in the request have been added to an index.

The indexer 732 ingests incoming data and transforms the data into searchable knowledge in the form of events. In the data intake and query system, an event is a single piece of data that represents activity of the component represented in FIG. 7 by the data source 702. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 732 can include a parsing module 734 and an indexing module 736 for generating and storing the events. The parsing module 734 and indexing module 736 can be modular and pipelined, such that one component can be operating on a first set of data while the second component is simultaneously operating on a second sent of data. Additionally, the indexer 732 may at any time have multiple instances of the parsing module 734 and indexing module 736, with each set of instances configured to simultaneously operate on data from the same data source or from different data sources. The parsing module 734 and indexing module 736 are illustrated in FIG. 7 to facilitate discussion, with the understanding that implementations with other components are possible to achieve the same functionality.

The parsing module 734 determines information about incoming event data, where the information can be used to identify events within the event data. For example, the parsing module 734 can associate a source type with the event data. A source type identifies the data source 702 and describes a possible data structure of event data produced by the data source 702. For example, the source type can indicate which fields to expect in events generated at the data source 702 and the keys for the values in the fields, and possibly other information such as sizes of fields, an order of the fields, a field separator, and so on. The source type of the data source 702 can be specified when the data source 702 is configured as a source of event data. Alternatively, the parsing module 734 can determine the source type from the event data, for example from an event field in the event data or using machine learning techniques applied to the event data.

Other information that the parsing module 734 can determine includes timestamps. In some cases, an event includes a timestamp as a field, and the timestamp indicates a point in time when the action represented by the event occurred or was recorded by the data source 702 as event data. In these cases, the parsing module 734 may be able to determine from the source type associated with the event data that the timestamps can be extracted from the events themselves. In some cases, an event does not include a timestamp and the parsing module 734 determines a timestamp for the event, for example from a name associated with the event data from the data source 702 (e.g., a file name when the event data is in the form of a file) or a time associated with the event data (e.g., a file modification time). As another example, when the parsing module 734 is not able to determine a timestamp from the event data, the parsing module 734 may use the time at which it is indexing the event data. As another example, the parsing module 734 can use a user-configured rule to determine the timestamps to associate with events.

The parsing module 734 can further determine event boundaries. In some cases, a single line (e.g., a sequence of characters ending with a line termination) in event data represents one event while in other cases, a single line represents multiple events. In yet other cases, one event may span multiple lines within the event data. The parsing module 734 may be able to determine event boundaries from the source type associated with the event data, for example from a data structure indicated by the source type. In some implementations, a user can configure rules the parsing module 734 can use to identify event boundaries.

The parsing module 734 can further extract data from events and possibly also perform transformations on the events. For example, the parsing module 734 can extract a set of fields (key-value pairs) for each event, such as a host or hostname, source or source name, and/or source type. The parsing module 734 may extract certain fields by default or based on a user configuration. Alternatively or additionally, the parsing module 734 may add fields to events, such as a source type or a user-configured field. As another example of a transformation, the parsing module 734 can anonymize fields in events to mask sensitive information, such as social security numbers or account numbers. Anonymizing fields can include changing or replacing values of specific fields. The parsing component 734 can further perform user-configured transformations.

The parsing module 734 outputs the results of processing incoming event data to the indexing module 736, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 732 can be configured to identify searchable segments that are parts of fields, searchable segments that are entire fields, or both. The parsing module 734 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 746, to find event data that matches a search query. In some implementations, segmentation can alternatively be performed by the forwarder 726. Segmentation can also be disabled, in which case the indexer 732 will not build a lexicon for the event data. When segmentation is disabled, the search system searches the event data directly.

Building index data structures generates the index 738. The index 738 is a storage data structure on a storage device (e.g., a disk drive or other physical device for storing digital data). The storage device may be a component of the computing device on which the indexer 732 is operating (referred to herein as local storage) or may be a component of a different computing device (referred to herein as remote storage) that the indexer 738 has access to over a network. The indexer 732 can manage more than one index and can manage indexes of different types. For example, the indexer 732 can manage event indexes, which impose minimal structure on stored data and can accommodate any type of data. As another example, the indexer 732 can manage metrics indexes, which use a highly structured format to handle the higher volume and lower latency demands associated with metrics data.

The indexing module 736 organizes files in the index 738 in directories referred to as buckets. The files in a bucket 744 can include raw data files, index files, and possibly also other metadata files. As used herein, "raw data" means data as when the data was produced by the data source 702, without alteration to the format or content. As noted previously, the parsing component 734 may add fields to event data and/or perform transformations on fields in the event data. Event data that has been altered in this way is referred to herein as enriched data. A raw data file 748 can include enriched data, in addition to or instead of raw data. The raw data file 748 may be compressed to reduce disk usage. An index file 746, which may also be referred to herein as a "time-series index" or tsidx file, contains metadata that the indexer 732 can use to search a corresponding raw data file 748. As noted above, the metadata in the index file 746 includes a lexicon of the event data, which associates each unique keyword in the event data with a reference to the location of event data within the raw data file 748. The keyword data in the index file 746 may also be referred to as an inverted index. In various implementations, the data intake and query system can use index files for other purposes, such as to store data summarizations that can be used to accelerate searches.

A bucket 744 includes event data for a particular range of time. The indexing module 736 arranges buckets in the index 738 according to the age of the buckets, such that buckets for more recent ranges of time are stored in short-term storage 740 and buckets for less recent ranges of time are stored in long-term storage 742. Short-term storage 740 may be faster to access while long-term storage 742 may be slower to access. Buckets may be moves from short-term storage 740 to long-term storage 742 according to a configurable data retention policy, which can indicate at what point in time a bucket is old enough to be moved.

A bucket's location in short-term storage 740 or long-term storage 742 can also be indicated by the bucket's status. As an example, a bucket's status can be "hot," "warm," "cold," "frozen," or "thawed." In this example, hot bucket is one to which the indexer 732 is writing data and the bucket becomes a warm bucket when the index 732 stops writing data to it. In this example, both hot and warm buckets reside in short-term storage 740. Continuing this example, when a warm bucket is moved to long-term storage 742, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 720 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 720 through the monitoring console 716 provided by the user interface system 714. Using the monitoring console 716, the user can configure and monitor an index cluster, and see information such as disk usage by an index, volume usage by an indexer, index and volume size over time, data age, statistics for bucket types, and bucket settings, among other information.

Figure 8:
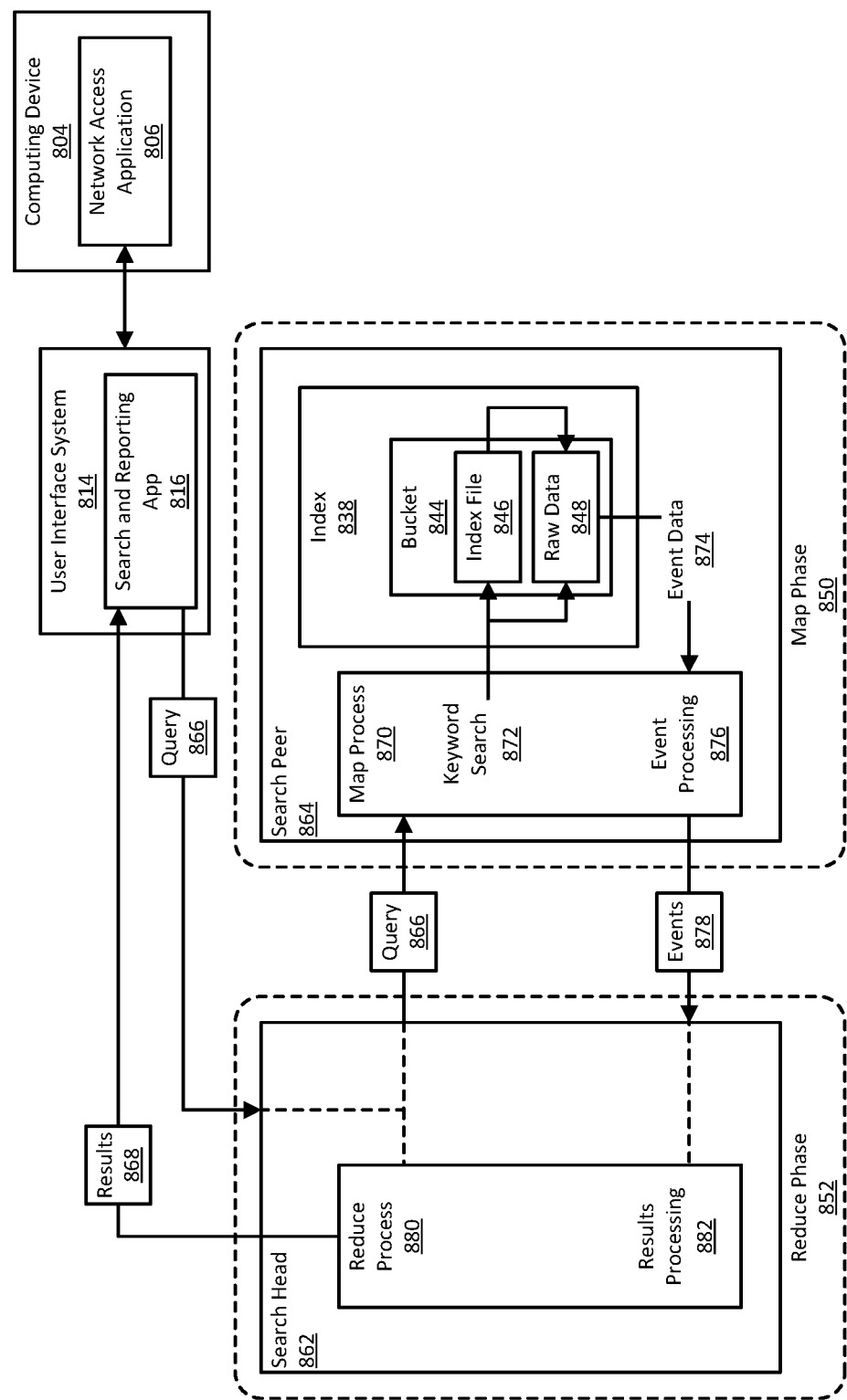
FIG. 8 is a block diagram illustrating in greater detail an example of the search system of a data intake and query system, such as the data intake and query illustrated in FIG. 6, in accordance with some example implementations.

FIG. 8 is a block diagram illustrating in greater detail an example of the search system 860 of a data intake and query system, such as the data intake and query system 610 of FIG. 6. The search system 860 of FIG. 8 issues a query 866 to a search head 862, which sends the query 866 to a search peer 864. Using a map process 870, the search peer 864 searches the appropriate index 838 for events identified by the query 866 and sends events 878 so identified back to the search head 862. Using a reduce process 882, the search head 862 processes the events 878 and produces results 868 to respond to the query 866. The results 868 can provide useful insights about the data stored in the index 838. These insights can aid in the administration of information technology systems, in security analysis of information technology systems, and/or in analysis of the development environment provided by information technology systems.

The query 866 that initiates a search is produced by a search and reporting app 816 that is available through the user interface system 814 of the data intake and query system. Using a network access application 806 executing on a computing device 804, a user can input the query 866 into a search field provided by the search and reporting app 816. Alternatively or additionally, the search and reporting app 816 can include pre-configured queries or stored queries that can be activated by the user. In some cases, the search and reporting app 816 initiates the query 866 when the user enters the query 866. In these cases, the query 866 maybe referred to as an "ad-hoc" query. In some cases, the search and reporting app 816 initiates the query 866 based on a schedule. For example, the search and reporting app 816 can be configured to execute the query 866 once per hour, once per day, at a specific time, on a specific date, or at some other time that can be specified by a date, time, and/or frequency. These types of queries maybe referred to as scheduled queries.

The query 866 is specified using a search processing language. The search processing language includes commands or search terms that the search peer 864 will use to identify events to return in the search results 868. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 866 to include sequential commands, where a subsequent command may operate on the results of a prior command. As an example, sequential commands may be separated in the query 866 by a vertical line ("I" or "pipe") symbol.

In addition to one or more search commands, the query 866 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 866 occurs in two broad phases: a map phase 850 and a reduce phase 852. The map phase 850 takes place across one or more search peers. In the map phase 850, the search peers locate event data that matches the search terms in the search query 866 and sorts the event data into field-value pairs. When the map phase 850 is complete, the search peers send events that they have found to one or more search heads for the reduce phase 852. During the reduce phase 852, the search heads process the events through commands in the search query 866 and aggregate the events to produce the final search results 868.

A search head, such as the search head 862 illustrated in FIG. 8, is a component of the search system 860 that manages searches. The search head 862, which may also be referred to herein as a search management component, can be implemented using program code that can be executed on a computing device. The program code for the search head 862 can be stored on a non-transitory computer-readable medium and from this medium can be loaded or copied to the memory of a computing device. One or more hardware processors of the computing device can read the program code from the memory and execute the program code in order to implement the operations of the search head 862.

Upon receiving the search query 866, the search head 862 directs the query 866 to one or more search peers, such as the search peer 864 illustrated in FIG. 8. "Search peer" is an alternate name for "indexer" and a search peer may be largely similar to the indexer described previously. The search peer 864 may be referred to as a "peer node" when the search peer 864 is part of an indexer cluster. The search peer 864, which may also be referred to as a search execution component, can be implemented using program code that can be executed on a computing device. In some implementations, one set of program code implements both the search head 862 and the search peer 864 such that the search head 862 and the search peer 864 form one component. In some implementations, the search head 862 is an independent piece of code that performs searching and no indexing functionality. In these implementations, the search head 862 may be referred to as a dedicated search head.

The search head 862 may consider multiple criteria when determining whether to send the query 866 to the particular search peer 864. For example, the search system 860 may be configured to include multiple search peers that each have duplicative copies of at least some of the event data and are implanted using different hardware resources q. In this example, the sending the search query 866 to more than one search peer allows the search system 860 to distribute the search workload across different hardware resources. As another example, search system 860 may include different search peers for different purposes (e.g., one has an index storing a first type of data or from a first data source while a second has an index storing a second type of data or from a second data source). In this example, the search query 866 may specify which indexes to search, and the search head 862 will send the query 866 to the search peers that have those indexes.

To identify events 878 to send back to the search head 862, the search peer 864 performs a map process 870 to obtain event data 874 from the index 838 that is maintained by the search peer 864. During a first phase of the map process 870, the search peer 864 identifies buckets that have events that are described by the time indicator in the search query 866. As noted above, a bucket contains events whose timestamps fall within a particular range of time. For each bucket 844 whose events can be described by the time indicator, during a second phase of the map process 870, the search peer 864 performs a keyword search 874 using search terms specified in the search query #A66. The search terms can be one or more of keywords, phrases, fields, Boolean expressions, and/or comparison expressions that in combination describe events being searched for. When segmentation is enabled at index time, the search peer 864 performs the keyword search 872 on the bucket's index file 846. As noted previously, the index file 846 includes a lexicon of the searchable terms in the events stored in the bucket's raw data 848 file. The keyword search 872 searches the lexicon for searchable terms that correspond to one or more of the search terms in the query 866. As also noted above, the lexicon incudes, for each searchable term, a reference to each location in the raw data 848 file where the searchable term can be found. Thus, when the keyword search identifies a searchable term in the index file 846 that matches a search term in the query 866, the search peer 864 can use the location references to extract from the raw data 848 file the event data 874 for each event that include the searchable term.

In cases where segmentation was disabled at index time, the search peer 864 performs the keyword search 872 directly on the raw data 848 file. To search the raw data 848, the search peer 864 may identify searchable segments in events in a similar manner as when the data was indexed. Thus, depending on how the search peer 864 is configured, the search peer 864 may look at event fields and/or parts of event fields to determine whether an event matches the query 866. Any matching events can be added to the event data #A74 read from the raw data 848 file. The search peer 864 can further be configured to enable segmentation at search time, so that searching of the index 838 causes the search peer 864 to build a lexicon in the index file 846.

The event data 874 obtained from the raw data 848 file includes the full text of each event found by the keyword search 872. During a third phase of the map process 870, the search peer 864 performs event processing 876 on the event data 874, with the steps performed being determined by the configuration of the search peer 864 and/or commands in the search query 866. For example, the search peer 864 can be configured to perform field discovery and field extraction. Field discovery is a process by which the search peer 864 identifies and extracts key-value pairs from the events in the event data 874. The search peer 864 can, for example, be configured to automatically extract the first 100 fields (or another number of fields) in the event data 874 that can be identified as key-value pairs. As another example, the search peer 864 can extract any fields explicitly mentioned in the search query 866. The search peer 864 can, alternatively or additionally, be configured with particular field extractions to perform.

Other examples of steps that can be performed during event processing 876 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 864 sends processed events 878 to the search head 862, which performs a reduce process 880. The reduce process 880 potentially receives events from multiple search peers and performs various results processing 882 steps on the received events. The results processing 882 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 882 can further include applying commands from the search query 866 to the events. The query 866 can include, for example, commands for evaluating and/or manipulating fields (e.g., to generate new fields from existing fields or parse fields that have more than one value). As another example, the query 866 can include commands for calculating statistics over the events, such as counts of the occurrences of fields, or sums, averages, ranges, and so on, of field values. As another example, the query 866 can include commands for generating statistical values for purposes of generating charts of graphs of the events.

The reduce process 880 outputs the events found by the search query 866, as well as information about the events. The search head 862 transmits the events and the information about the events as search results 868, which are received by the search and reporting app 816. The search and reporting app 816 can generate visual interfaces for viewing the search results 868. The search and reporting app 816 can, for example, output visual interfaces for the network access application 806 running on a computing device 804 to generate.

The visual interfaces can include various visualizations of the search results 868, such as tables, line or area charts, Chloropleth maps, or single values. The search and reporting app 816 can organize the visualizations into a dashboard, where the dashboard includes a panel for each visualization. A dashboard can thus include, for example, a panel listing the raw event data for the events in the search results 868, a panel listing fields extracted at index time and/or found through field discovery along with statistics for those fields, and/or a timeline chart indicating how many events occurred at specific points in time (as indicated by the timestamps associated with each event). In various implementations, the search and reporting app 816 can provide one or more default dashboards. Alternatively or additionally, the search and reporting app 816 can include functionality that enables a user to configure custom dashboards.

The search and reporting app 816 can also enable further investigation into the events in the search results 816. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 866. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 9:
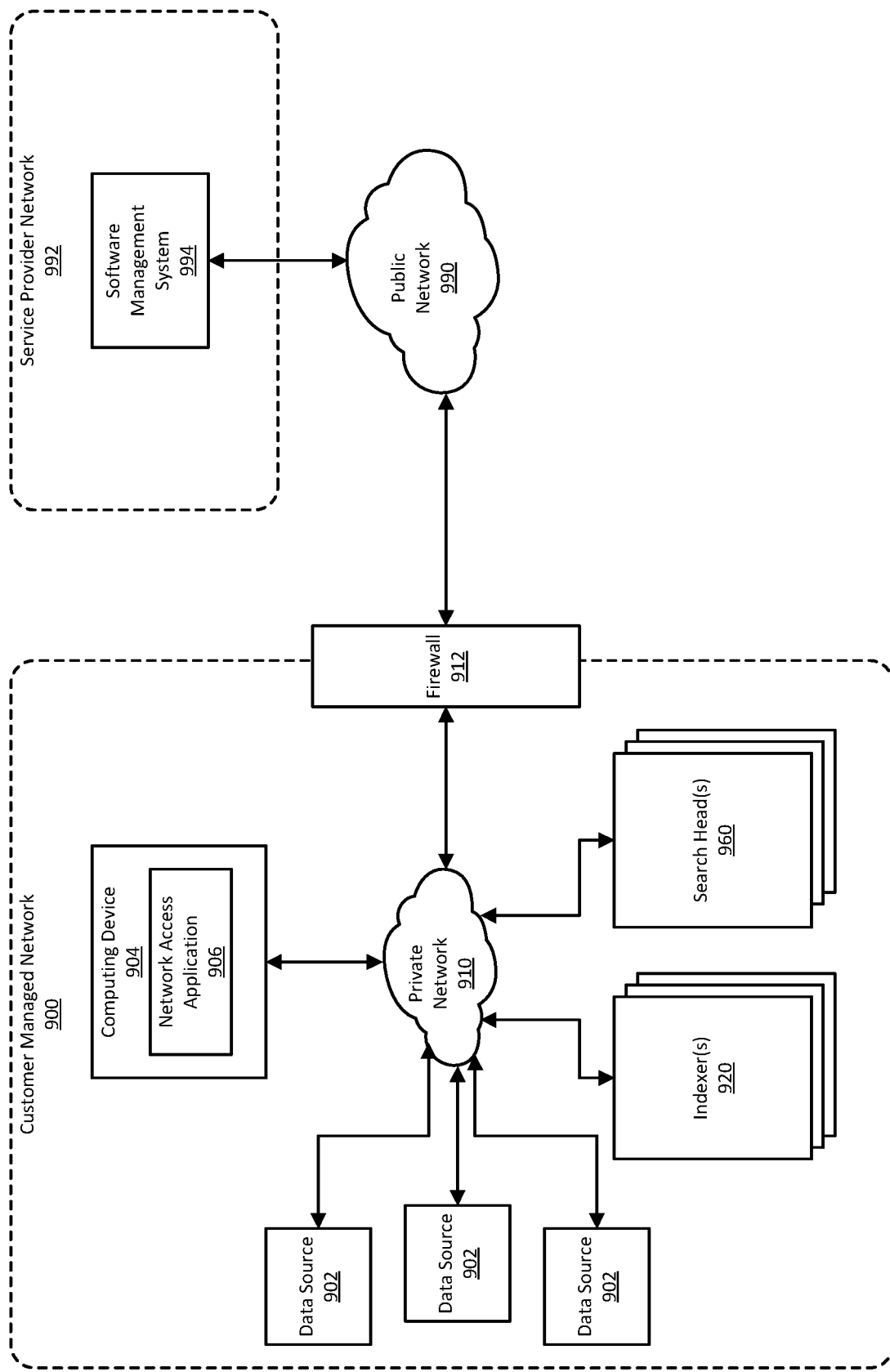
FIG. 9 illustrates an example of a self-managed network that includes a data intake and query system, in accordance with some example implementations.

FIG. 9 illustrates an example of a self-managed network 900 that includes a data intake and query system. "Self-managed" in this instance means that the entity that is operating the self-managed network 900 configures, administers, maintains, and/or operates the data intake and query system using its own compute resources and people. Further, the self-managed network 900 of this example is part of the entity's on-premise network and comprises a set of compute, memory, and networking resources that are located, for example, within the confines of a entity's data center. These resources can include software and hardware resources. The entity can, for example, be a company or enterprise, a school, government entity, or other entity. Since the self-managed network 900 is located within the customer's on-prem environment, such as in the entity's data center, the operation and management of the self-managed network 900, including of the resources in the self-managed network 900, is under the control of the entity. For example, administrative personnel of the entity have complete access to and control over the configuration, management, and security of the self-managed network 900 and its resources.

The self-managed network 900 can execute one or more instances of the data intake and query system. An instance of the data intake and query system may be executed by one or more computing devices that are part of the self-managed network 900. A data intake and query system instance can comprise an indexing system and a search system, where the indexing system includes one or more indexers 920 and the search system includes one or more search heads 960.

As depicted in FIG. 9, the self-managed network 900 can include one or more data sources 902. Data received from these data sources may be processed by an instance of the data intake and query system within self-managed network 900. The data sources 902 and the data intake and query system instance can be communicatively coupled to each other via a private network 910.

Users associated with the entity can interact with and avail themselves of the functions performed by a data intake and query system instance using computing devices. As depicted in FIG. 9, a computing device 904 can execute a network access application 906 (e.g., a web browser), that can communicate with the data intake and query system instance and with data sources 902 via the private network 910. Using the computing device 904, a user can perform various operations with respect to the data intake and query system, such as management and administration of the data intake and query system, generation of knowledge objects, and other functions. Results generated from processing performed by the data intake and query system instance may be communicated to the computing device 904 and output to the user via an output system (e.g., a screen) of the computing device 904.

The self-managed network 900 can also be connected to other networks that are outside the entity's on-premise environment/network, such as networks outside the entity's data center. Connectivity to these other external networks is controlled and regulated through one or more layers of security provided by the self-managed network 900. One or more of these security layers can be implemented using firewalls 912. The firewalls 912 form a layer of security around the self-managed network 900 and regulate the transmission of traffic from the self-managed network 900 to the other networks and from these other networks to the self-managed network 900.

Networks external to the self-managed network can include various types of networks including public networks 990, other private networks, and/or cloud networks provided by one or more cloud service providers. An example of a public network 990 is the Internet. In the example depicted in FIG. 9, the self-managed network 900 is connected to a service provider network 992 provided by a cloud service provider via the public network 990.

In some implementations, resources provided by a cloud service provider may be used to facilitate the configuration and management of resources within the self-managed network 900. For example, configuration and management of a data intake and query system instance in the self-managed network 900 may be facilitated by a software management system 994 operating in the service provider network 992. There are various ways in which the software management system 994 can facilitate the configuration and management of a data intake and query system instance within the self-managed network 900. As one example, the software management system 994 may facilitate the download of software including software updates for the data intake and query system. In this example, the software management system 994 may store information indicative of the versions of the various data intake and query system instances present in the self-managed network 900. When a software patch or upgrade is available for an instance, the software management system 994 may inform the self-managed network 900 of the patch or upgrade. This can be done via messages communicated from the software management system 994 to the self-managed network 900.

The software management system 994 may also provide simplified ways for the patches and/or upgrades to be downloaded and applied to the self-managed network 900. For example, a message communicated from the software management system 994 to the self-managed network 900 regarding a software upgrade may include a Uniform Resource Identifier (URI) that can be used by a system administrator of the self-managed network 900 to download the upgrade to the self-managed network 900. In this manner, management resources provided by a cloud service provider using the service provider network 992 and which are located outside the self-managed network 900 can be used to facilitate the configuration and management of one or more resources within the entity's on-prem environment. In some implementations, the download of the upgrades and patches may be automated, whereby the software management system 994 is authorized to, upon determining that a patch is applicable to a data intake and query system instance inside the self-managed network 900, automatically communicate the upgrade or patch to self-managed network 900 and cause it to be installed within self-managed network 900.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

The invention claimed is:

1. A computer-implemented method, comprising:
   presenting, by a client computing device, on a graphical user interface, a dashboard with independent panels, each independent panel is associated with a respective search query and is generated on the dashboard based, at least in part, on an output produced as a result of executing the independent panel's associated search query, wherein the independent panels each includes a plurality of fields and the output produced as a result of executing an independent panel's associated search query to populate the plurality of fields of each independent panel with field values;

generating, by the client computing device, a filter condition for application to a respective search query of one of the independent panels, the generation based on user input provided through the one of the independent panels of the graphical user interface;

applying, by the client computing device, the filter condition to the respective search query of the one of the independent panels to produce an updated search query and execute the updated search query to update the one of the independent panels; and applying, by the client computing device, the filter condition to respective search query or queries of one or more other independent panels of the dashboard to produce updated search query or queries for the one or more other independent panels and execute the updated search query or queries to update the one or more of the other independent panels;

wherein each field of the plurality of fields of an independent panel is designatable through their respective independent panel to be a primary field for their respective independent panel, wherein each field value of a field that has been designated as a primary field for the respective independent panel is selectable through the respective independent panel to generate a filter condition for application to a search query associated with the respective independent panel as well as for application to search query or queries of one or more other independent panels of the graphical user interface;

wherein field values of one or more fields of an independent panel that have not been designated as a primary field for the respective independent panel cannot be selected through their respective independent panel to generate a filter condition for application to a search query associated with the respective independent panel as well as for application to search query or queries of one or more other independent panels of the graphical user interface.

2. The computer-implemented method of claim 1, wherein the respective search queries of the independent panels that are executed are the default search queries of the independent panels.

3. The computer-implemented method of claim 1, wherein each independent panel is associated with a respective query that is different from the respective queries of the other independent panels of the dashboard.

4. The computer-implemented method of claim 1, wherein each of at least some of the independent panels includes a table, the table of an independent panel is populated by data outputted as a result of executing the associated search query of the independent panel.

5. The computer-implemented method of claim 1, wherein each of at least some of the independent panels includes a table, the table of an independent panel is populated by data outputted as a result of executing the associated search query of the independent panel and can be stack sorted independent of the other tables of the other independent panels.

6. The computer-implemented method of claim 1, wherein each independent panel includes a plurality of columns and one or more rows, wherein each column corresponds to one of the fields of the respective independent panel, and each column populated by field values generated by the associated search query of the respective panel.

7. The computer-implemented method of claim 1, wherein one or more of the independent panels each includes a text field, the text field of an independent panel for displaying a textual representation of a filter condition generated through the independent panel and for entering user input for generating a filter condition through the independent panel.

8. The computer-implemented method of claim 1, wherein generating the filter condition includes generating a search string based, at least in part, on the user input.

9. The computer-implemented method of claim 1, wherein generating the filter condition includes generating a search string embodied in an Extensible Markup Language (XML) token.

10. The computer-implemented method of claim 1, wherein generating the filter condition is based, at least in part, on the user input and based on a designated primary field of the independent panel through which the user input was entered.

11. The computer-implemented method of claim 1, wherein applying the filter condition to the respective search query of the one of the independent panels is by applying the filter condition to a default search query of the one of the independent panels.

12. The computer-implemented method of claim 1, wherein applying the filter condition to the respective search query of the one of the independent panels includes adding a search string to the respective search query to produce the updated search query.

13. The computer-implemented method of claim 1, wherein applying the filter condition to the respective search query of the one of the independent panels includes adding a search string to the respective search query to produce the updated search query, and wherein the respective search query includes a default search query that was previously updated with one or more previously provided search strings.

14. The computer-implemented method of claim 1, wherein applying the filter condition to the respective search query of the one of the independent panels includes substituting a prior added search string included in the respective search query of the one of the independent panels with a replacement search string to produce the updated search query.

15. The computer-implemented method of claim 1, wherein applying the filter condition to the respective search query or queries of one or more of the other independent panels of the dashboard to produce updated search query or queries for the one or more of the other independent panels includes applying the filter condition to the respective search queries of all the other independent panels of the dashboard to produce updated search queries for all the other independent panels.

16. The computer-implemented method of claim 1, wherein applying the filter condition to the respective search query or queries of one or more of the other independent panels of the dashboard to produce updated search query or queries for the one or more of the other independent panels includes applying the filter condition that is embodied in an Extensible Markup Language (XML) token to the respective search query or queries of the one or more of the other independent panels.

17. The computer-implemented method of claim 1, wherein executing the updated search query or queries to update the one or more of the other independent panels includes transmitting to a data intake and query system the updated query or queries for the one or more of the independent panels and receiving from the data intake and query system, in response to the transmission of the updated query or queries, data to populate and/or configure the one or more of the other independent panels.

18. One or more non-transitory computer-readable storage media including instructions that, when executed by one or more processors, cause the one or more processors to perform the steps of:

present, by a client computing device, on a graphical user interface, a dashboard with independent panels, each independent panel is associated with a respective search query and is generated in the dashboard based, at least in part, on an output produced as a result of executing the independent panel's associated search query, wherein the independent panels each includes a plurality of fields and the output produced as a result of executing an independent panel's associated search query to populate the plurality of fields of each independent panel with field values;

generate, by the client computing device, a filter condition for application to a respective search query of one of the independent panels, the generation based on user input provided through the one of the independent panels of the graphical user interface;

apply, by the client computing device, the filter condition to the respective search query of the one of the independent panels to produce an updated search query and execute the updated search query to update the one of the independent panels; and apply, by the client computing device, the filter condition to respective search query or queries of one or more other independent panels of the dashboard to produce updated search query or queries for the one or more other independent panels and execute the updated search query or queries to update the one or more of the other independent panels;

wherein each field of the plurality of fields of an independent panel is designatable through their respective independent panel to be a primary field for their respective independent panel, wherein each field value of a field that has been designated as a primary field for the respective independent panel is selectable through the respective independent panel to generate a filter condition for application to a search query associated with the respective independent panel as well as for application to search query or queries of one or more other independent panels of the graphical user interface;

wherein field values of one or more fields of an independent panel that have not been designated as a primary field for the respective independent panel cannot be selected through their respective independent panel to generate a filter condition for application to a search query associated with the respective independent panel as well as for application to search query or queries of one or more other independent panels of the graphical user interface.

19. A computing device, comprising:

one or more processors; and memory containing instructions that, when executed by the one or more processors, cause the computing device to:

present on a graphical user interface, a dashboard with independent panels, each independent panel is associated with a respective search query and is generated in the dashboard based, at least in part, on an output produced as a result of executing the independent panel's associated search query, wherein the independent panels each includes a plurality of fields and the output produced as a result of executing an independent panel's associated search query to populate the plurality of fields of each independent panel with field values;

generate a filter condition for application to a respective search query of one of the independent panels, the generation based on user input provided through the one of the independent panels of the graphical user interface;

apply the filter condition to the respective search query of the one of the independent panels to produce an updated search query and execute the updated search query to update the one of the independent panels; and apply the filter condition to respective search query or queries of one or more other independent panels of the dashboard to produce updated search query or queries for the one or more other independent panels and execute the updated search query or queries to update the one or more of the other independent panels;

wherein each field of the plurality of fields of an independent panel is designatable through their respective independent panel to be a primary field for their respective independent panel, wherein each field value of a field that has been designated as a primary field for the respective independent panel is selectable through the respective independent panel to generate a filter condition for application to a search query associated with the respective independent panel as well as for application to search query or queries of one or more other independent panels of the graphical user interface;

wherein field values of one or more fields of an independent panel that have not been designated as a primary field for the respective independent panel cannot be selected through their respective independent panel to generate a filter condition for application to a search query associated with the respective independent panel as well as for application to search query or queries of one or more other independent panels of the graphical user interface.

* * * * *